United States Patent [19]

Kleinberger

[11] Patent Number: 5,062,074
[45] Date of Patent: * Oct. 29, 1991

[54] INFORMATION RETRIEVAL SYSTEM AND METHOD

[75] Inventor: Paul J. Kleinberger, Jerusalem, Israel

[73] Assignee: TNET, Inc., Mendota Heights, Minn.

[*] Notice: The portion of the term of this patent subsequent to Nov. 20, 2007 has been disclaimed.

[21] Appl. No.: 575,046

[22] Filed: Aug. 30, 1990

Related U.S. Application Data

[63] Continuation of Ser. No. 393,838, Aug. 14, 1989, Pat. No. 4,972,349, which is a continuation of Ser. No. 938,163, Dec. 4, 1986, abandoned.

[51] Int. Cl.$^5$ .............................................. G06F 15/40
[52] U.S. Cl. ................................. 364/900; 364/974.3; 364/974.4; 364/974.6
[58] Field of Search ... 364/200 MS File, 900 MS File

[56] References Cited

U.S. PATENT DOCUMENTS

| | | | |
|---|---|---|---|
| 4,255,796 | 3/1981 | Gabbe et al. | 366/900 |
| 4,358,824 | 11/1982 | Glickman et al. | 364/200 |
| 4,450,520 | 5/1984 | Hollaar et al. | 364/200 |
| 4,453,217 | 6/1984 | Boivie | 364/300 |
| 4,471,459 | 9/1984 | Dickinson et al. | 364/900 |
| 4,495,566 | 1/1985 | Dickinson et al. | 364/200 |
| 4,499,553 | 2/1985 | Dickinson et al. | 364/900 |
| 4,554,631 | 11/1985 | Reddington | 364/300 |
| 4,580,218 | 4/1986 | Raye | 364/300 |

FOREIGN PATENT DOCUMENTS 0130050 1/1985 Japan.

OTHER PUBLICATIONS

Ozkarahan: "Database Machines & Database Management", 1986, Prentice-Hall, Inc. (Englewood Cliffs, N.J., U.S.), pp. 498-522.

Salton, G.: "Automatic Information Organization and Retrieval", 1968, McGraw-Hill Book Company (N.Y., U.S.), pp. 57-65.

*Primary Examiner*—Gareth D. Shaw
*Assistant Examiner*—Kakali Chaki
*Attorney, Agent, or Firm*—Quarles & Brady

[57] ABSTRACT

A computerized information retrieval system is formed of a textbase of texts of variable length and content. The texts are selected from the textbase on the basis of Boolean logic searches among keywords associated with the texts. When a group is retrieved from such a search, the system automatically segregates the texts based on the presence of absence of a criterion key keyword selected so as to segregate the texts into sub-groups. The same criterion key analysis can then be applied recursively to the sub-groups. The criterion key analysis can then be applied recursively to the sub-groups. The resulting sub-groups are then displayed to the user in a hierarchical display to illustrate the relationships among the texts. A string comparison routine is also disclosed to search for similar keywords.

6 Claims, 15 Drawing Sheets

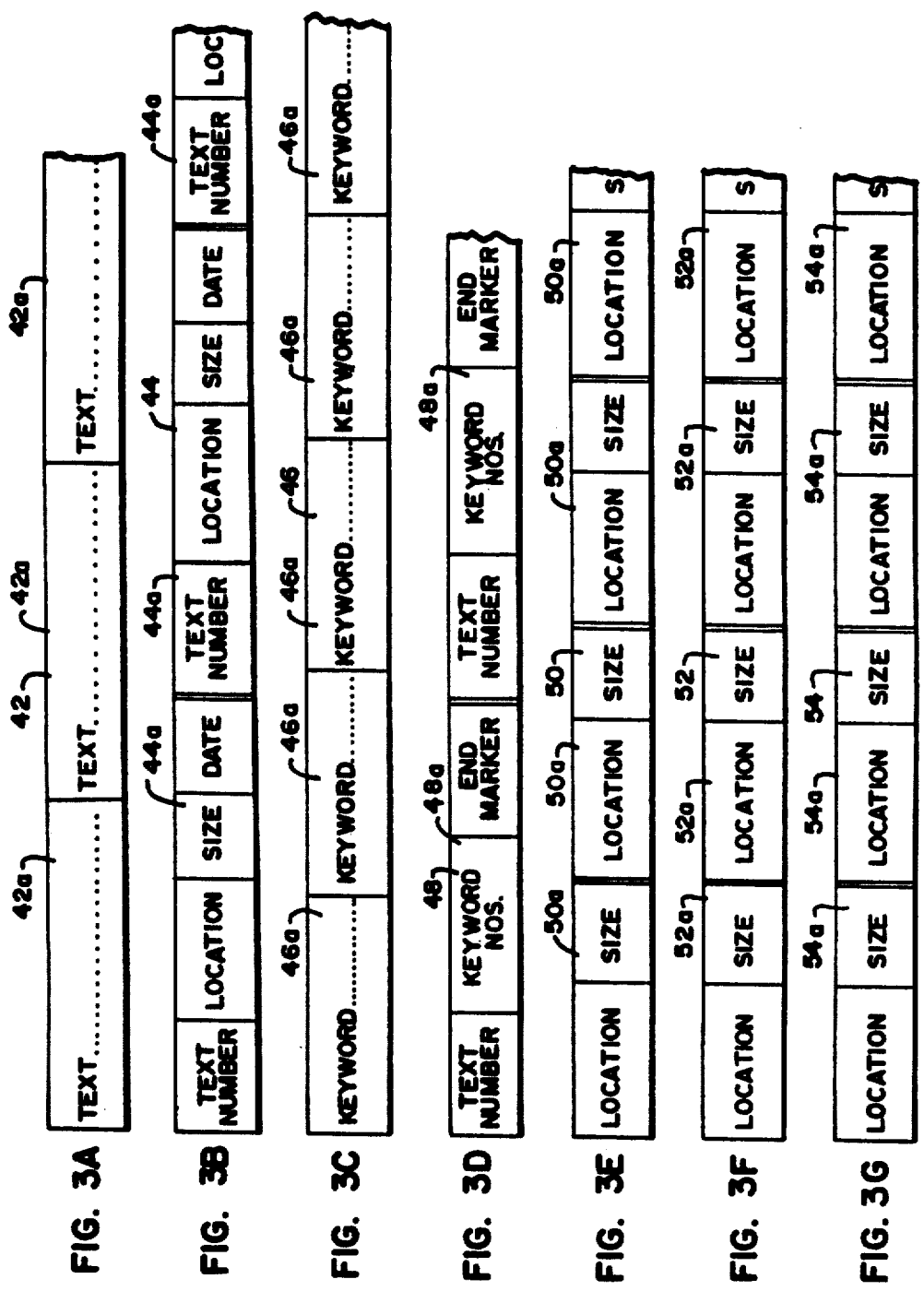

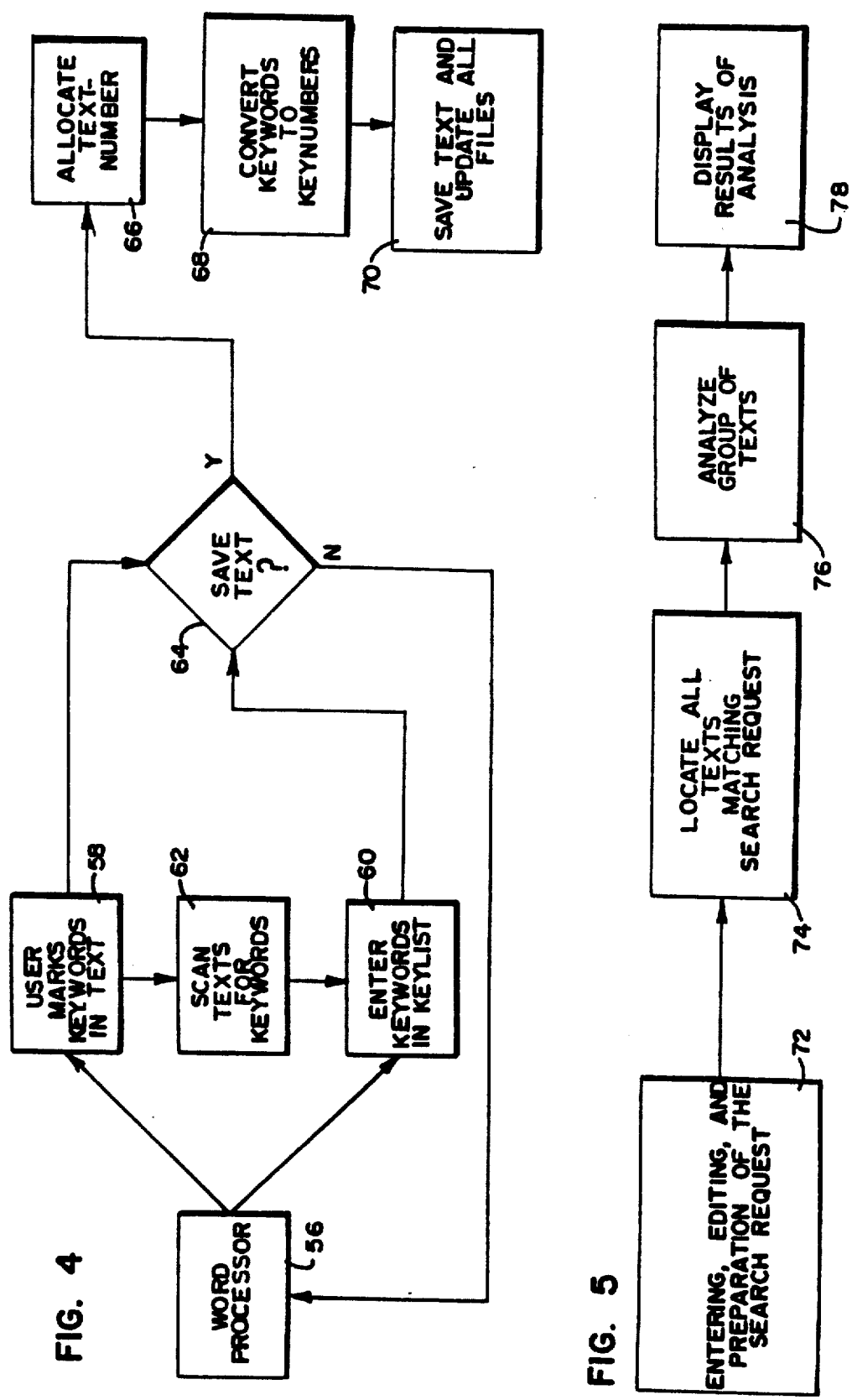

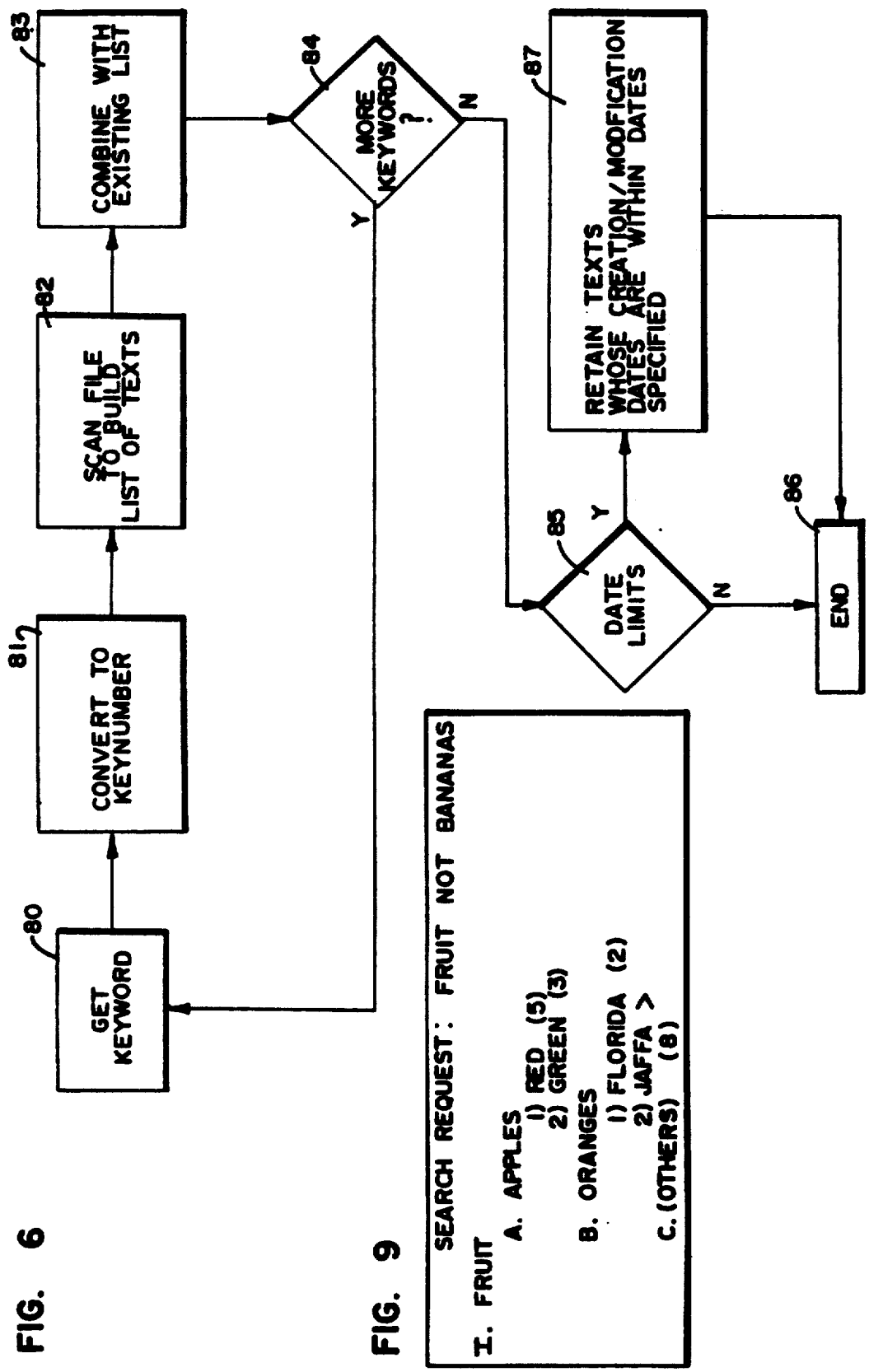

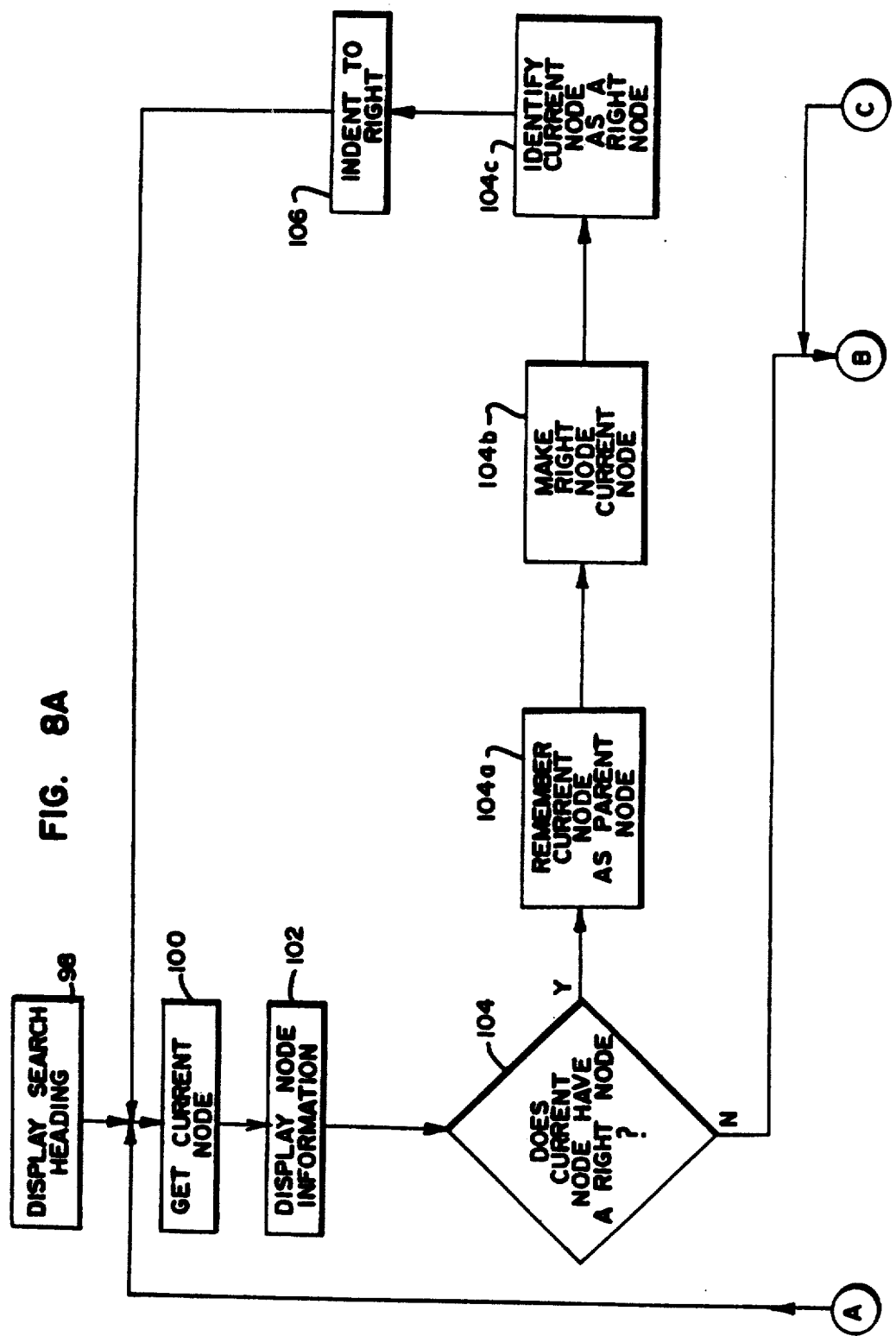

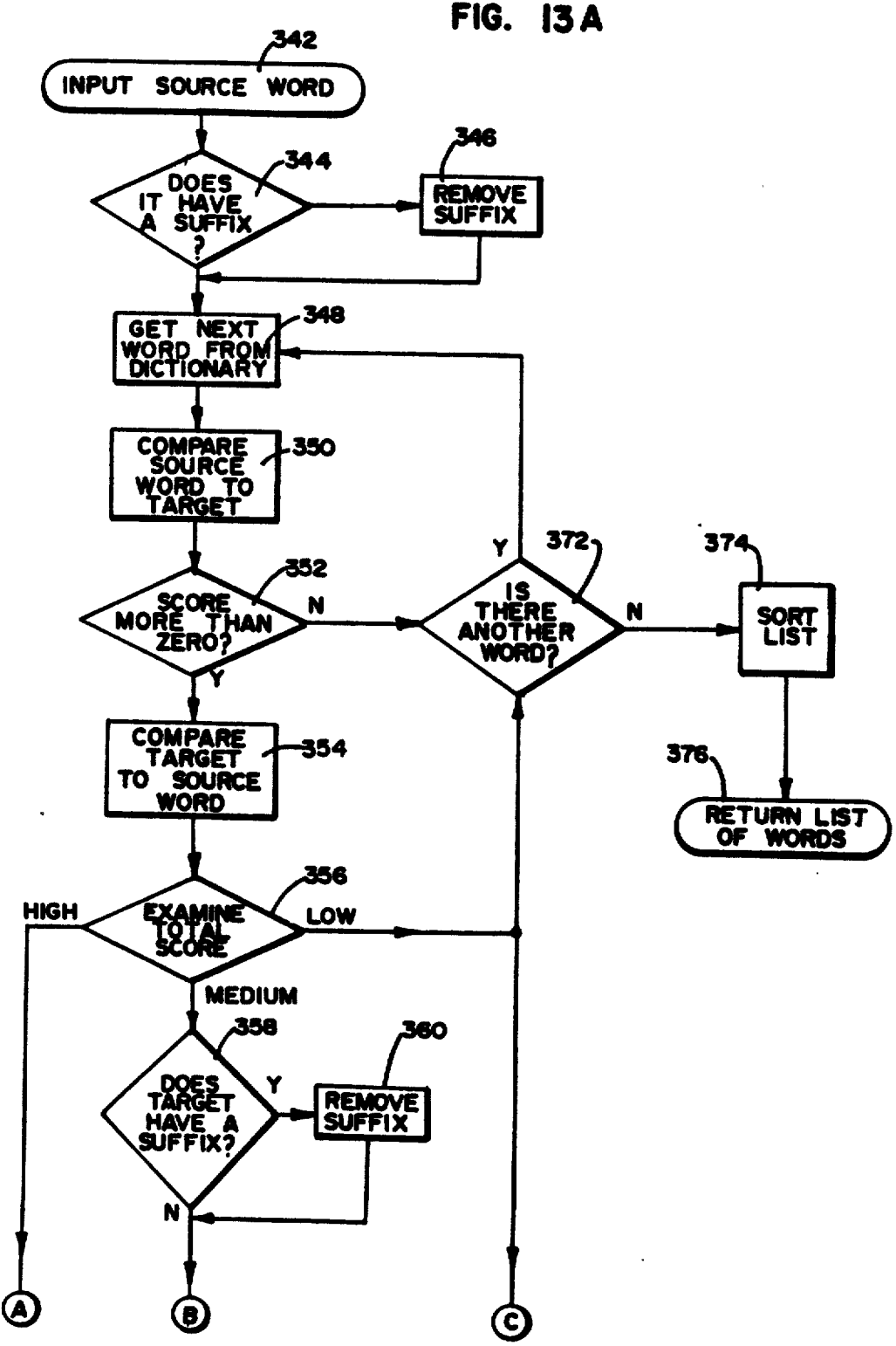

INFORMATION RETRIEVAL SYSTEM AND METHOD

REFERENCE TO RELATED APPLICATIONS

This application is a continuation of application Ser. No. 07/393,838 filed Aug. 18, 1989, which was a continuation of application Ser. No. 06/938,163 filed Dec. 4, 1986, now abandoned.

BACKGROUND OF THE INVENTION

The present invention relates to an information retrieval system and method which analyzes and summarizes the information contained in a group of texts and identifies similar words and word collections.

"Information retrieval" is the process of selecting and presenting specific items from within a large and heterogeneous collection of texts, according to users' descriptions of the subjects in which they are interested.

Some information retrieval systems index all the words appearing in all the texts, others index "keywords" which are descriptors assigned to each text by the text's author or by someone else. In both cases the user who wants to find a text does so by asking for a search on a particular word, or on logical (Boolean) combinations of words, or on words with some maximum distance (or similar relationship) between them in the texts, etc. In addition to requesting a specific word or words, most systems allow the user to search for a character string; e.g., LEXIS TM and DIALOG TM.

A typical search request, on traditional systems, generates a long list or a large collection of texts all of which logically satisfy the search criterion, but only a small percentage of which will actually be of use. The user is forced to expend much time and much energy winnowing (searching) through the texts found by the system, to pick out those truly relevant to his needs.

This problem originates from the fact that the user typically does not have EXACT knowledge in advance of how the subjects of interest to him will have been described.

If his description is very specific, he will lose information: anything relevant to his needs but described in a slightly different manner will not be found by the system.

If his description is very general, many irrelevant texts will be found also, and the winnowing process will be costly, time consuming, and tiring.

For this reason:

On the level of office systems and personal computers, despite the proliferation of computers and the wide use of STRUCTURED data-bases, the use of personal and interpersonal catch-all text-based information retrieval systems is almost unknown—the bother and the overhead involved in using traditional systems are too great to make the effort worth the trouble.

On the level of massive public data-bases, most bibliographic information systems have attempted to solve the problem by limiting users to a predetermined vocabulary of acceptable keywords. (Users have a reasonable chance of guessing what their subject will have been called, since both users and authors are confined to that published list of keyword possibilities.) This solution has been workable but at a price:

(1) To be an effective user of such databases one must study and develop expertise in the use of the system. They are, thus, inaccessible to untrained users, and inappropriate for casual use.

(2) Because of their rigid structure, such systems are of limited use (and indeed are little used) in dynamic environments such as would be found, for example, in the case of an unstructured corporation-wide catch-all collection of information.

Two general types of information retrieval systems and methods currently in use are as follows:

(1) In a first method, once the information retrieval systems (whatever their selection methodology) have isolated or identified the group of texts which satisfy the user's search criterion, the systems present the user with a count of the number of texts within that group, and the opportunity of sequentially reviewing the texts which are members of that group.

The user either looks through the texts themselves, one by one, or looks through sequential listings of some part of the information available about each text: that is, the user may choose to review a sequential list of the titles of the texts, or abstracts of the texts, or lists of keywords of the texts, or the initial paragraphs of the texts, or the dates and origins of the texts, or some combinations of the above. The user is then given some method of specifying (usually by number) those texts for which he wishes fuller information, printouts, etc.

An example of this type of information retrieval system is the DIALOG TM information retrieval system. DIALOG TM provides a user with the number of records (texts) satisfying the search request. The user can then request that any or all of the records be displayed and/or printed in any one of a number of formats containing varying and differing amounts of information.

(2) A second method is generally used when the number of texts presented by an initial search is too large, or the original search criterion was too general, to make it practical for the user to look through sequential listings to pick out the texts he wants. This method is essentially an extension of the original boolean search facility: the user can ask for additional searches to be made, and then can manipulate the additional lists of texts thus generated by requesting further lists to be created based on Boolean combinations of the preceding lists (e.g., the new list to include all the texts on list "A" and also on list "B" but to exclude any which appear on list "C", etc.).

An example of this type of information retrieval system is DIALOG TM, where the user can make additional search requests, and create new lists of texts based on Boolean combinations of preceding lists.

Another example of this type of information retrieval system is the LEXIS TM system wherein a user can modify his/her search request in an effort to narrow down the number of cases (texts) developed from the initial search request.

These methods, Boolean combinations of lists and sequential screening or printouts of the texts themselves or of some subset of the information available about each text, generally constitute the state of the art in information retrieval at this time, for the phase of the retrieval process extending between the point at which the retrieval system has identified a group of texts as being responsive to the search criterion, and the point at which the user chooses and is presented with the individual texts which he judges to be actually germane to his needs.

In addition to other advantages, the present invention solves the problems described above, by making it possible for the user to see at a glance a break-down of the types of information contained in the texts selected by his initial request. From the generated display, the user can choose the texts which are relevant to his true interest both easily and quickly.

The present invention also relates to a system and method for identifying words in a target word list which are similar to a source word, and/or for identifying phrases or sentences in a target population which are similar to a source phrase or sentence.

Computer programs are used in a number of contexts to obtain words which are "similar" to some given source word, most notably in indexing and information retrieval programs and in spelling checkers. In indexing and retrieval programs, the purpose of such a search for "similar" words is to provide a more exhaustive list of terms related to the input word, such as plurals or forms modified by prefixes or suffixes. In the case of spelling checkers, the purpose is to be able to make a suggestion as to the most likely word the user had intended, once a word is encountered which does not appear in the program's dictionary.

In the traditional and simplest solution to this problem, most often used in indexing and retrieval programs, the user specifies the exact nature of the relationship between the source word and the words being sought by means of "wild card" symbols, most typically the '?' and '*' characters. In this protocol, the user instructs the program exactly which parts of a word he is interested in matching, and in which parts other characters may appear, the question mark '?' being used to signify any individual character and the asterisk '*' any sequence of characters. Thus, by way of example, the user would ask for "law*" if he intended to find words like "laws", "lawyer" or "lawless". Or a search for "analy?e" could be used to locate both the American (with a 'z') and the British (with an 's') spellings of the word.

In the case of spelling checkers, a more flexible approach is needed, since the user does not usually known that he has made a spelling mistake, nor does he know in advance the relationship between the way he thinks a word is spelled and the way it is spelled in fact. Most typically, spelling checkers locate "similar" words by first restricting the search to words beginning with the same letter as the misspelled words and then use a list of common spelling and typographical errors to find words which differ from the source word only by these letters.

An alternate approach used by spelling checkers is to convert the word to an approximate phonetic form, and then search a dictionary of such phonetic words, on the assumption that the user typically has a clearer idea of how the word sounds than of how it is spelled. This last approach is usually quite effective at finding spelling errors, though it suffers from the drawback of being unable to deal with typographical mistakes. This technique is therefore quite commonly combined with elements of the previously mentioned approach, in order to obtain a more comprehensive list of possible words.

Some information retrieval programs use the phonetic approach also: along with a regular index of words (or of keywords) in their textbase, they create a parallel index in which those same words are represented phonetically. Search requests are then converted to phonetic format and the attempt is made to locate the search words' phonetic translation in the phonetic index. An example of this is the COMPUMARK ™ system which is used in searching for trademarks.

Regarding "similar sentences", the state-of-the-art is more simply described. There are complex systems which actually parse sentences into their component parts of speech and analyze the semantic relationships among those parts; however, the applicant is not aware of any retrieval systems in which the sequencing of the words in a search request (as distinguished from the identity of the search-request words and the specified logical relationships among them) is used to influence the choice of the texts to be retrieved, or the ordering or ranking of the texts once they are found.

SUMMARY OF THE INVENTION

The analyzing and summarizing aspect of the invention makes explicit the inherent relationships among a group of texts with associated keyword descriptions, by analyzing the keywords held in common by subgroups of texts within the overall group. The invention comes into play once a group of texts has been selected using standard search methodology—at the point at which the user would either have to make further guesses as to how to narrow down his search criterion, or would be presented with a sequence of texts that would then have to be "winnowed through."

The invention is a system and method of analyzing and of presenting the informational content of this group of texts, as a group. The user sees presented on a display medium (screen) the equivalent of an annotated "TABLE OF CONTENTS," organized as a standard outline or in some similarly graphic format, analyzing that group of texts into major subject areas, sub-categories, sub-sub-categories, etc. Each "TABLE OF CONTENTS" outline is dynamically generated in response to specific search requests, and constitutes a kind of "birds'-eye view" of the contents of the textbase in that subject area at that time. For the user looking for a specific kind of information of which he has only a general description (that's the typical case), a glance at the table of contents, a matter of seconds, usually suffices to eliminate from consideration most of the irrelevant material. Relevant sub-categories usually are immediately evident. If necessary, the user can pick out for further analysis (in one implementation just by moving the cursor on the screen) a much-reduced group of texts (one of the categories presented to him in the table of contents) and repeat the analysis process, creating another table of contents, this time of the sub-category. One or two iterations will usually suffice, even when starting with a group of hundreds of texts, to get to a table of contents in which most descriptions will be of individual specific texts rather than of groups of texts. With an appropriate command; e.g., by moving a cursor and pressing a key, the user chooses the specific text or texts he wants to see according to the descriptions he sees on the table of contents, and with an appropriate command; e.g., a keystroke, brings those texts to the screen or sends them to be printed.

It is anticipated that this technique will lead to an extension of the use of information retrieval into areas where it had not been convenient or practical to use it before, some examples being as follows:

(a) Specific information can be located much more rapidly than had been possible using prior technology. Experience so far has shown that the time needed for finding specific information in a large textbase is on the order of 10% of what it normally would take, and the process is far more agreeable.

(b) It is practical to search for information whenever the user knows some general characteristics of what he's looking for, even though he has no idea how that information may have been specifically described in the textbase.

(c) It is practical to maintain and use large heterogeneous collections of textual information, and to do searches to find specific elements of that information, without limiting authors to a predetermined lexicon of "keywords." This means that users (e.g., in a corporate environment) can choose keywords spontaneously and still succeed in finding relevant information among each others' entries.

(d) "Browsing" the textbase becomes a pleasant and meaningful operation, quite different from paging through texts or reading the thesaurus, which are the only "browsing" techniques available in traditional technology.

In one implementation of the invention, the information retrieval system is coupled with a word-processor, for convenience in entering texts into the textbase, and with an output screen presenting the results of the above analysis in traditional outline format. The output screen shows the categories and sub-categories of subjects found to be included in the texts selected as a result of the original search request, to any desired level of detail. The user moves the screen cursor to point to a category on the outline for which he wants a more detailed break-down, and the process continues until individual texts are being referenced on the outline. Then by pressing a key the user can direct the system to send the chosen text to the printer or bring it to the screen.

The significance of the invention is that the amount of time needed for the user to isolate texts of interest to him, from among groups of texts which satisfy his initial search request but are in fact irrelevant to him, is reduced by a large factor. The information retrieval process is made more convenient thereby; it is practical using this system to find specific texts with only the most minimal initial information as to how they may have been keyworded; and various practical constraints which have restricted the ways in which textbases needed to be organized in order to guarantee that stored information could be found again, can be relaxed.

The invention also relates to a process which enables the computer to locate "similar" words in a manner more flexible and more exhaustive than any currently used technique, so far as we know. In particular, the invention does not require any specification by the user as to the relationship between the input word and the target words, nor does it rely on phonetic translation or any restrictive list of typical mistakes. The invention rather makes use of the actual structure of the word itself, and searches for words which have a similar structure or which include a similar structure as part of a larger structure. The invention is therefore able to locate a far more comprehensive list of "similar" words than is the case with other techniques.

The structure of the input word is analyzed in terms of groups of letters, starting with letter pairs and working up to larger groups, and accords to any word in the target dictionary which contains these letter groupings a number of points determined by the size of the group and/or its location in the word. Words which are given a large number of points by the process are then presented to the user, in descending order of the number of points allocated, for his selection.

In the case of searching for similar sentences rather than similar words, the technique is identical, except that groups of words, rather than groups of letters, are compared. One field of application for this invention is in information retrieval systems, where the user presents his search request in the form of a phrase or sentence, and texts are selected from the data-base and/or prioritized, according to the scores achieved when either their descriptions (keywords, title, abstract) or the texts themselves are evaluated according to this method. Since in information retrieval systems the typical search request finds many texts which are, in fact, irrelevant to the user, the invention, when employed to automatically winnow and/or prioritize texts can save time and trouble for users of the system.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIGS. 3A-G are schematic views illustrating file structures of an embodiment of an information retrieval system and method in accordance with the principles of the present invention;

FIG. 4 is a schematic illustrating the addition of text to a textbase in accordance with the principles of the present invention;

FIG. 5 is a schematic view illustrating searching the textbase of FIG. 2 in accordance with the principles of the present invention;

FIG. 6 is a schematic view illustrating locating of texts which match the search request;

FIGS. 8A-B are schematic views illustrating presentation of the analysis to a user.

FIG. 9 is a view illustrating a sample presentation of results at a display media;

FIGS. 13A-B are logic flow designs of an embodiment of the present invention providing the ability to search for similar words;

DETAILED DESCRIPTION OF A PREFERRED EMBODIMENT OF THE PRESENT INVENTION

Figure 1:
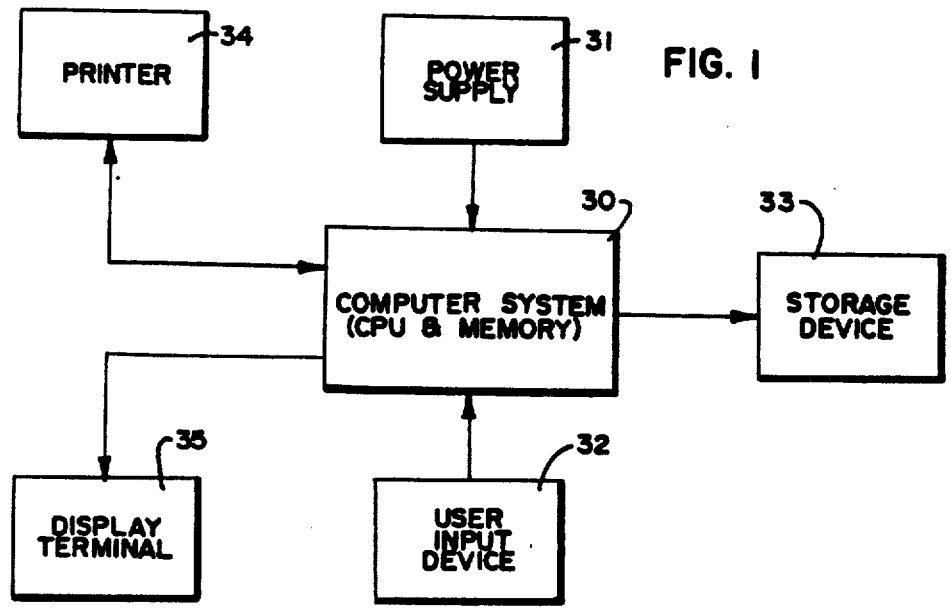
FIG. 1 is a schematic view illustrating a stand-alone computer system wherein the present invention might be utilized.
Figure 2:
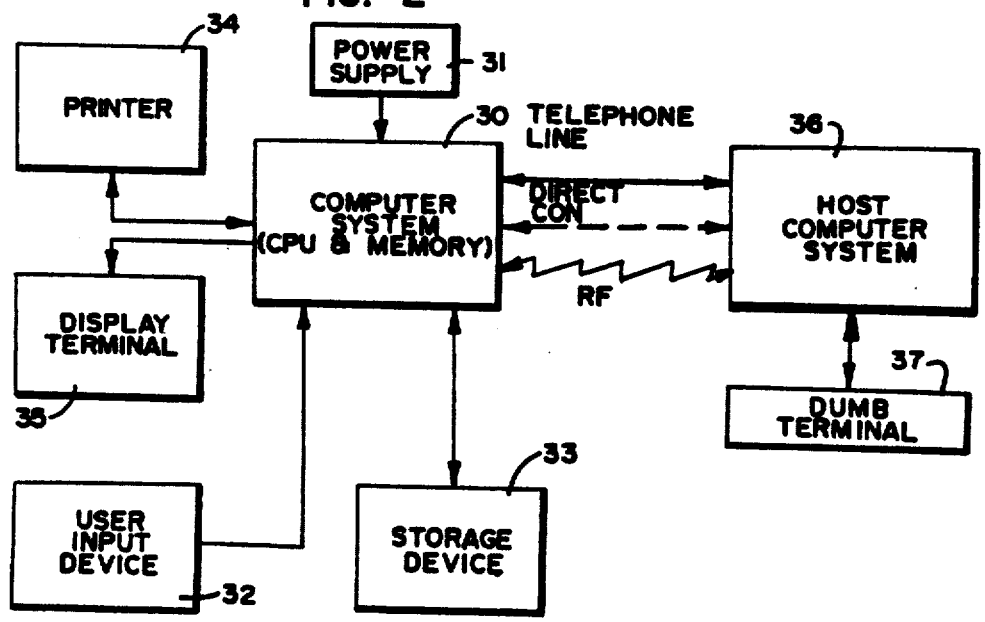
FIG. 2 is a schematic view illustrating a computer terminal system interconnected to a remote host computer system, the present invention being implemented in either or both computer systems.

One implementation of the invention is a program written in the C language, with some sections written in Assembly language. The implementation to be described runs on the IBM-PC and compatible microcomputers. As generally illustrated in FIGS. 1 and 2, the program is in principle easily transportable to a large family of micro, mini, and main-frame computers, and can be used in a multi-user environment. For example, as illustrated in FIG. 1, the program is loaded into the memory of a computer system 30 powered by a suitable power supply 31. The computer system 30 will include a user input device 32 such as a keyboard and/or mouse. In addition, the computer system will preferably include a storage device 33 for storage of text material. A printer 34 will be provided for hard copy printout of results and a display terminal 35 will be provided for display of the program analysis at the display terminal. As illustrated in FIG. 2, the computer system 30 might be interconnected to a host computer system 36 by any number of different methods such as by telephone lines, a direct connect via a serial interface cable, a radio frequency (RF) interconnection, etc. The program of the present invention might be utilized in the computer system 30 and/or the host computer 36. In a multiuser environment, the program might be utilized from a dumb terminal 37 interconnected to the host computer 36.

FILE STRUCTURE

The file structure of an embodiment of a program in accordance with the principles of the present invention will now be described.

As illustrated in FIGS. 3A-G, the textual information itself and the indexing information necessary to access it are kept in seven data files.

A text file 42 contains variable-size records 42a of the texts which have been saved in the textbase, there being a record for each text in the textbase. This information is ordinarily all kept in one file, though the possibility exists of splitting it into several smaller files if the physical limitations of the computer system being used prevent a single file of large enough size being maintained.

A text pointer file 44 contains information as to where each individual text is located within the text file 42 itself. Space in the text file 42 is allocated as it becomes available (by old texts being deleted or updated); an ordered list is therefore necessary in order to locate the desired text at any time. Each record 44a of the text pointer file 44 includes a Text Number field assigning a unique number to each of the texts, a Location field specifying the text location, a Size field specifying the size of the text, and a Date field for providing information as to the date each text was last modified, for use when searching for texts which meet specific data criteria.

A keyword file 46 contains variable-size records 46a listing every keyword which has been defined in the textbase. The keywords may have been defined in several different ways; for example, the author may define the keywords as the text is entered, the keywords may be defined automatically through the use of an automatic keywording feature as described below, text down-loaded from a commercial data base may have keywords already predefined, etc. A keynumber is allocated to each keyword on the basis of its position in the keyword file 46.

An index of which texts contain which keywords is kept in text keyword file 48. This file contains a variable-size record 48a for each text in the textbase, the entries being in the form of the number of the text being referred to, followed by a list of the keynumbers of the keywords associated with that text, followed by an end marker to indicate the end of that list and then the entry for the next text.

A text index file 50 includes a record 50a for each text providing an index to the location and size of the entry in the text keyword file 48 for each text.

Free key file 52 and free text file 54 are lists of available space in files 48 and 42, respectively, so that space in those files can be reused as texts are deleted or updated. The files 52 and 54 and their associated records 52a, 54a have a structure similar to that of the text index file 50.

ADDING TEXTS TO THE TEXTBASE

FIG. 4 illustrates the process by which texts are created and saved in the textbase. Texts might be created at 56 by a word processor function associated with the program of the present invention, or by "importing" texts from files which have been created by other programs, such as by other word processor programs or texts developed from a data base search request. The user defines the keywords which he wants to use to describe that text, either by marking them in the text itself at 58 or by entering the keywords in a separate keyword list at 60. Keywords which the user has marked in the text are automatically scanned at 62 and added to the keyword list; both the text itself and the keyword list are available for editing throughout this process.

The same process is used to modify keywords defined in a text which has previously been saved in the textbase; the text is retrieved from the textbase in the normal manner (see below), and is then available for editing in the word processor.

When the user has finished entering or modifying the text, he enters a command; e.g., presses a key, to save it at 64. A number is allocated to the text at 66, based on the next available position in the text pointer file 44. The keyword list for the text is then converted to keynumbers at 68, either by finding the existing keyword in the keyword file 46 or by adding a new keyword to the file 46. The position of a keyword in the keyword file 46 corresponds to the keyword number assigned to that keyword. The text itself, together with its keyword list, is added to the text file 42 and the textnumber and list of keynumbers added to the text-keyword file 48. The index files 44, 50, 52, and 54 are then updated with the appropriate information.

In the case of saving a text which previously existed in the textbase the process remains substantially the same; it is saved using its previous text-number rather than allocating a new number, and the old information on keywords which describe that text is deleted from the text keyword file 48 and replaced with the new information.

SEARCHING THE TEXTBASE

Figure 7:
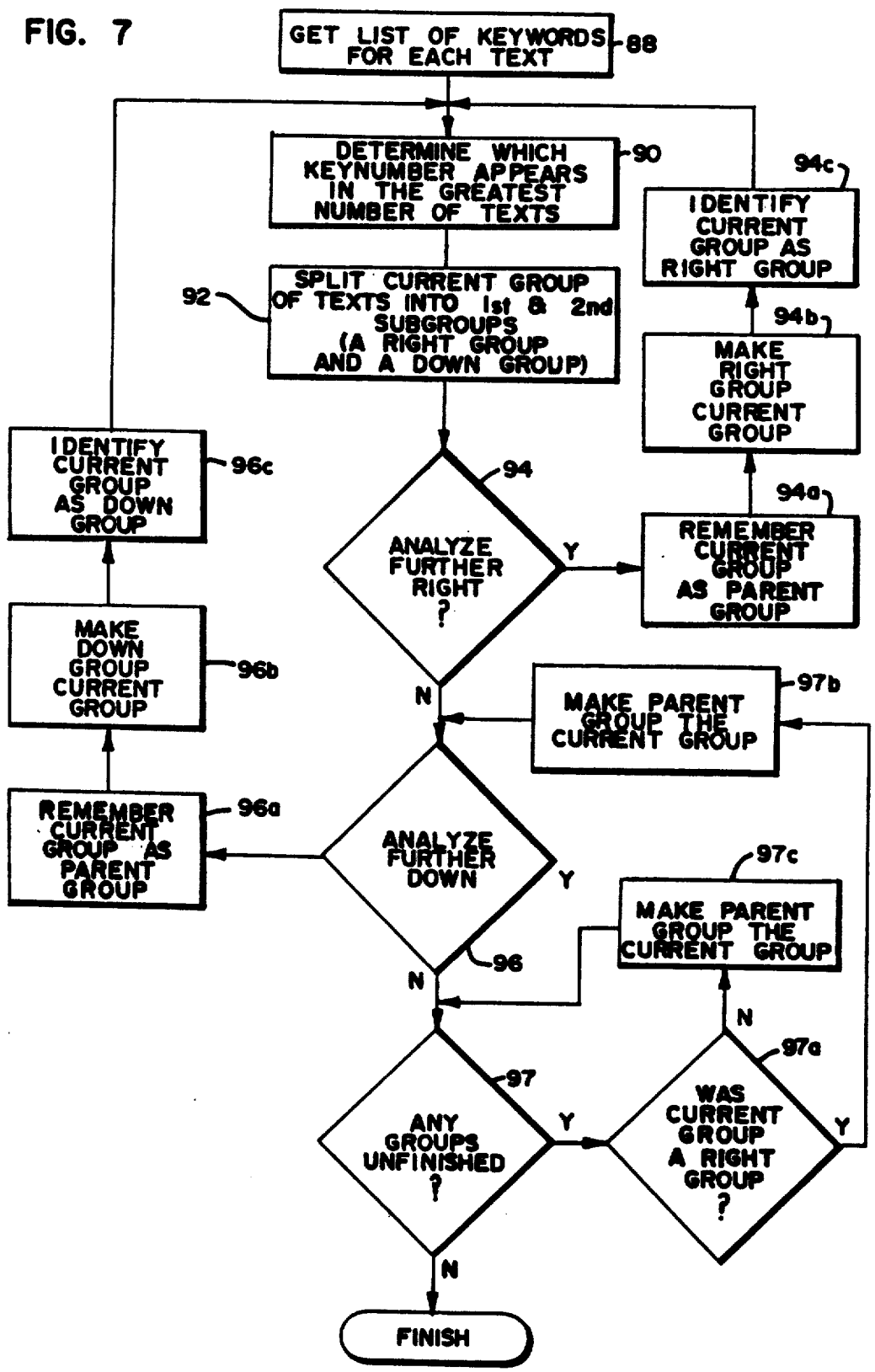
FIG. 7 is a schematic view illustrating analyzing the texts found in the search.
Figure 8B:
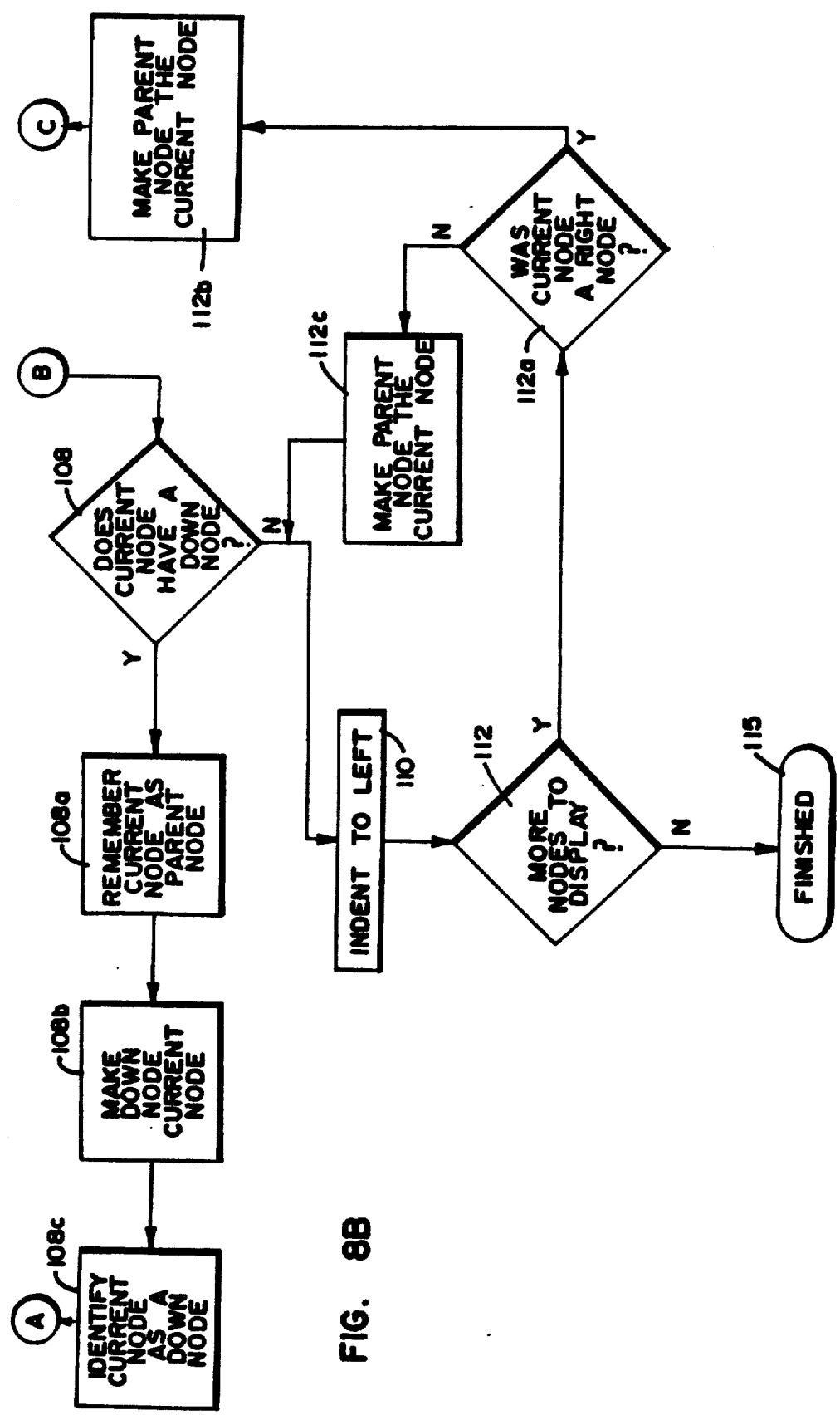
Figure 10:
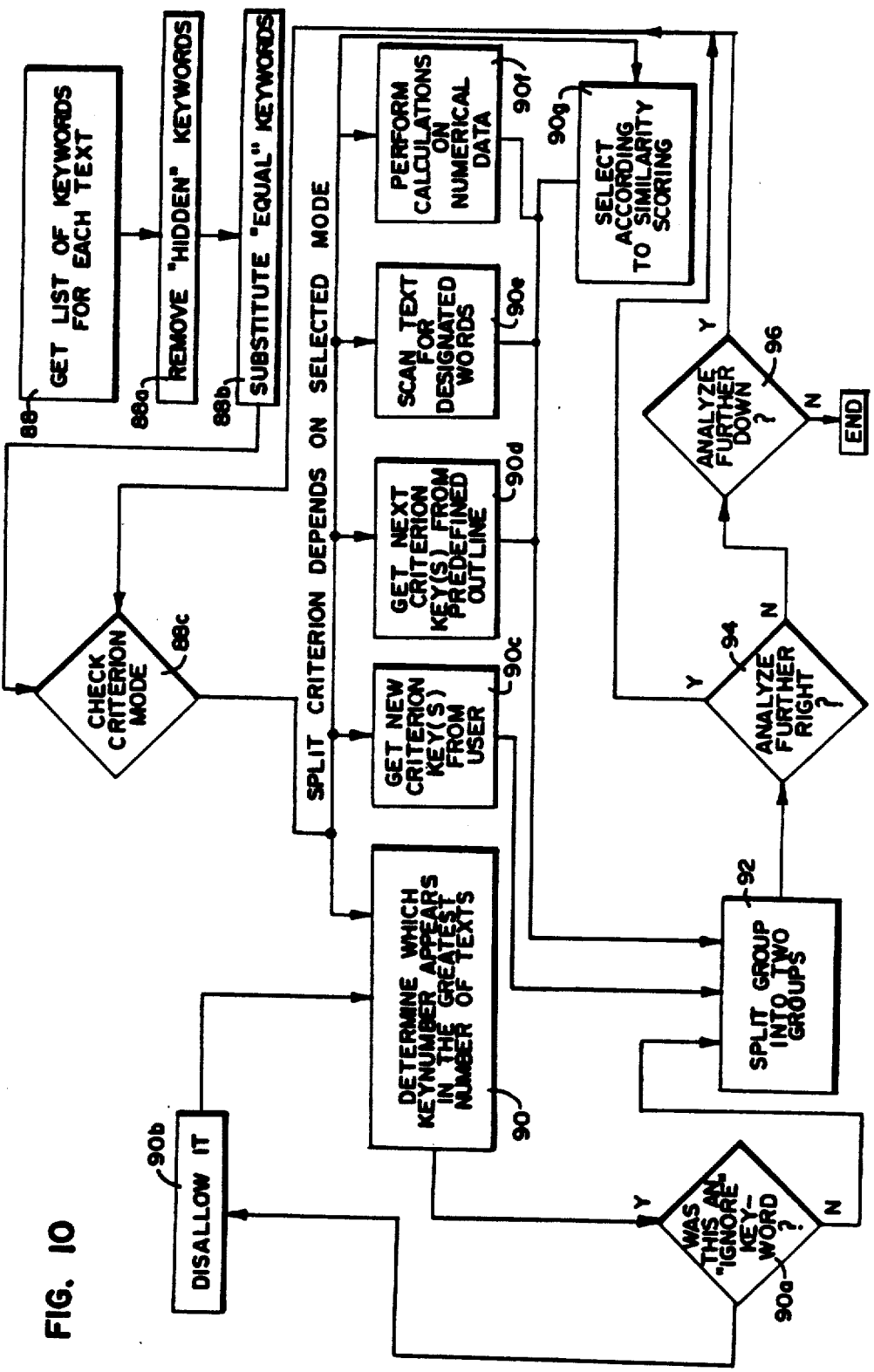
FIG. 10 is a schematic view of the process shown in FIG. 7, but illustrating various additional features of analysis.

The procedure by which the user searches the textbase to find a particular text or texts is illustrated in FIG. 5. The user initially enters his search request at 72, in the form of the keyword or keywords which describe the information he is looking for. Boolean combinations or keywords may be used in the description to logically describe the set of texts which is being searched for. If the user has asked that similar words or pre-defined "equivalent" words be substituted into his search request, the substitution is made at this time. (This process is described below and in FIGS. 12 through 14.) The program then searches the textbase at 74 to locate all texts which match the search request, as is shown in further detail in FIG. 6. At 76, the program analyzes the set of texts which are found to satisfy the search request as shown in FIGS. 7 and 10, and at 78, the program displays the results of this analysis at the user's display terminal (screen) as shown in FIG. 8.

As illustrated in FIG. 6, texts are selected by scanning the text-keyword file 48 for each keyword in the search request, and building a list of the texts which match the request. This list is constructed by taking from the search request each keyword in turn at 80, looking up its keynumber at 81 in the keyword file 46, and then scanning the text-keyword file 48 to find all texts which contain that keynumber at 82. The numbers of the texts are added to the list as they are found at 82. This list is then combined at 83 with the list of texts which had been found by previous iterations of this process, which dealt with keywords mentioned in earlier parts of the keyword request. The lists are combined according to the logical operation specified by the user. At 84, the process is repeated, the list produced by each successive iteration being combined with the list created by all previous iterations, until all the keywords in the search request have been dealt with. At 85, the program checks if the user has requested that the search be limited to texts created (or modified) within certain date limits. If the user has imposed no such date limits, at 86 the text selection is terminated. If the user has requested date limits, at 87 the listed texts are checked against dates stored in the text pointer file 44 and only those texts whose creation/modification dates fall within the limits are retained.

The program then analyzes the set of texts which has been found and presents the results of that analysis. The process by which the analysis is carried out, and the manner in which the results are presented, will now be described.

ANALYZING THE TEXTS FOUND IN THE SEARCH

The program analyzes the set of texts which has been found to match the initial search request, by means of the process shown in FIG. 7. First, at 88 the program obtains the list of keynumbers associated with each text in the set. These lists are obtained by reading them from the text-keyword file 48. The lists for each text are then scanned at 90 and the number of texts in which each keynumber occurs is counted in order to identify the "criterion key"—the most frequently occurring keynumber, i.e., the keyword which is associated with the greatest number of texts in that set.

The set of texts is then divided into two subsets at 92; the "right-group" containing all texts which are described by the "criterion key", and the "down-group" containing those texts which are not described by the criterion key. The "right-group" is thus a list of all the texts in the current set which include among their keywords the "criterion key"; all remaining texts from the current set are listed in the "down-group".

As will now be described, these two subsets are then in turn analyzed by the same process of finding the most commonly occurring keynumber and using it to split the set of texts; the two sections of the program at 90 and 92 being performed recursively until all the texts have been analyzed, or until such time as a decision is reached not to continue analysis further in either the "right" or the "down" direction.

If at 94, a decision is made to continue the analysis further in the "right" direction, then note is taken at 94a of the identity of the current group, as it will be the "parent" group for the forthcoming recursive iteration of the process. Then at 94b, the sub-group which had been the "right-group" created at 92 is marked as the new upcoming "current" group, and note is taken at 94c that it was originally created as a "right-group" at 92. The analysis routines now invoke themselves recursively; that is, handling of the previous current group (now the parent group) is interrupted and the system begins the analysis of the new current group at 90. The full analysis is thus a set of nested processes; for a group of text to be fully analyzed, the analyzing routines first split the initial group into two sub-groups, and then invoked themselves to handle the further analysis of each of the resulting sub-groups. Thus, the process proceeding to handle the new current group at 90 and at 92 may again be interrupted at 94 to handle yet another right group produced at 92 during this second iteration, and/or at 96 to handle analysis of the "down-group" produced at 92 during this second iteration. The procedure, if the iteration is interrupted at 96, is similar to that described above at 94a, 94b, and 94c; note is taken at 96a of the identity of the current group, which will be the parent group for the upcoming iteration. Then at 96b the sub-group which had been the "downgroup" created at 92 during the current iteration is marked as the current group for the upcoming iteration, note is taken at 96c that it had originally been a "down-group" and it is processed starting at 90.

During any iteration, if a decision at 94 is not to analyze further right, and the decision at 96 is not to analyze further down, then at 97 a check is made whether the current group has a parent group, (since the existence of the parent group means the existence of a group whose processing had been interrupted at 94 or 96). At 97a, a check is made as to whether the current group had originally been a "right-group" or a "down-group", this being a way of identifying the point at which processing of the parent group had been interrupted. If the current group had been a "right-group", its parent group (noted at 94a) is reidentified at 97b as the current group, and its processing is taken up at 96. If the current group had not been a "right-group", then it had been a "down-group". Its parent group noted at 96a is reidentified as the current group at 97c and processing of this reinstated current group continues at 97. Thus, the process of analysis having been interrupted potentially numerous times for the anaylsis of sub-groups and sub-sub-groups eventually completes all the interrupted analyses until eventually a parent group is reinstated as the current group, which was the original group with which the whole analysis procedure was begun. When the analysis of this group proceeds to 97, it will be found to have no parent group, and the analysis procedure terminates.

In this way every sub-group of the original group of texts is analyzed to the desired depth and a "tree" built out of the original list of texts. This tree is an analysis of the relationships among the various texts in terms of the keywords which describe them; it groups related texts together according to the similarities in their subject matter and locates all the texts in a structure of headings and sub-headings.

At each node of the tree, the list or node in the "right" direction defines the texts which belong to the largest category from the set of texts which was input to the node, and the list or node in the "down" direction defines those texts not included in that largest category. Starting at the root node (the list of texts generated by the user's original search request) and reading down from node to node, provides a listing of the major categories into which the original group of texts has been divided.

This listing is automatically sorted into "order of importance" through the above procedure of selecting the successive "criterion keys"; the larger the group of texts described by any particular criterion key, the closer it will be to the top of the list. The tree, then, provides a break-down of the original list of texts into its various subject matters, and can be extended to any desired level of detail.

Control of the analysis 94, 96 is achieved either under interactive user control or automatically on the basis of the number of texts already found and displayed. In automatic mode, analysis to the "right" (that is, more detailed analysis of a group of texts which are described by the "criterion key") is terminated at 94 either when all the texts in the set have been shown, or when the depth of analysis of that set is such that further analysis would take up too much space, making it impossible to show the "down-list" within the limits which have been set for the number of lines of analysis to display. Analysis "down" (those texts which are not described by the current "criterion key") is terminated at 96 either when all texts have been shown, or on reaching a predetermined limit as to the number of lines to show.

The user may control the analysis process by setting in advance the number of display lines at which he wishes automatic analysis to stop, or interactively by at each stage in the process deciding whether to further continue analysis either "right" or "down", and how far to continue it in either direction. In addition, as specified below, the user may invoke various additional features affecting the procedure of analysis as generally illustrated in FIG. 10.

RESULTS OF THE ANALYSIS

As generally illustrated in FIG. 8, the results of the analysis procedure described above is presented to the user as a screen display, indicating the groups of texts which have been found and their relationships to each other, in the form of a "table of contents" of headings, sub-headings, and texts.

The process by which this table of contents is created is illustrated in FIG. 8. First, the description of the original search request is displayed on the screen at 98. Then the first node, or "trunk" of the tree, (being the information provided by the analysis of the first group of texts to be analyzed at 90) is referenced at 100 and the keywords which describe it (the criterion key, and any other keywords which are common to all the texts of the group) are put on the screen at 102. The existence of any texts which that node completely describes (that is, texts all of whose keywords have by now appeared on the screen) is then indicated on the screen at 102 by using an arrow symbol to represent them. Non-printing codes which include the text's text-number are embedded in the table of contents at this point. These codes are used later, if the user asks to see the text whose existence is indicated by the arrow displayed. If there is at this time no right node (because the user, controlling the analysis interactively, chose not to split the group, or because a pre-set maximum depth of analysis had been reached), yet the group does still contain texts which have not yet been completely analyzed (i.e., texts some of whose keywords have not yet appeared on the screen), then this fact is indicated by showing the number of such texts in brackets; e.g., "(8)". In this case, non-printing codes are embedded in the table of contents giving the location in memory of information about this node/subgroup, including the list of texts belonging to it. This information is used later if the user asks to "expand" the analysis of this group's texts, or to perform some other manipulation on the texts of this group.

At 104, the program then checks if there is a "right-node" associated with the current node (such a right node will have been produced by the analysis if there is room to expand further to the right in the outline, and if there are still texts with unexamined keywords in the node). If such a "right-node" exists, the count of how far to indent the next line on the screen or printer is increased by one at 106.

At this point, the routine we are describing invokes itself recursively. The handling of the recursive process (104a, b, c) parallels that described above for 94a, b, c as the handling of 108a, b, c follows that of 96a, b, c. Indeed, the entire procedure described in FIG. 8 parallels that described in FIG. 7, with the difference that FIG. 7 describes the splitting of the groups of text into sub-groups (at 90, 92), and FIG. 8 describes the display of information about each group at 102 and controls the level of indentation of the display lines at 106 and 110. Control of the return from recursive iterations at 112, 112a, b, c parallels that described above for 97, 97a, b, c.

Thus the transition from 106 to 100 in FIG. 8 is a recursive invokation of the routine being described. Without the routine having completed its activity, the "right-node" is now designated as the current node to be handled 104b (the node whose processing is interrupted being referred to as the "parent-node") 104a, the level of indentation on the display is incremented 106, and the very same routine starts out "from the top" handling the current node (which had been the right-node) as if it were being invoked for the first time. Thus, the routine described in FIG. 8 invokes itself; while still in the middle of handling the root node, it calls itself to handle the right-node.

The new current node is then handled as described, including the handling of its own right and down nodes, until the process runs to completion at 112. At 112 there are unfinished nodes to be handled, at 112a this node's parent node is seen to have been a right node, at 112b it is reinstated as current node and its processing continues at 108, which is just after the point at which handling of the node had been interrupted in order to handle its right node.

Next, the program checks whether a "down-node" exists at 108. If so, it is identified as the current node (without changing the indentation), a process similar to the one just described is undertaken at 108a, b, c, and the routine invokes itself again 100. Thus, handling of the parent node is again suspended while the down-node (now the current node in the new invokation) is handled. When work on the down-node (which includes work on any of its subordinate nodes) reaches 112 and 112a, the parent node is reinstated as current node at 112c, and the level of indentation used (at 102) in creating display lines is reduced by one at 110. Since, in the example we have been running through, the node which is now the current node was the original "root" node, at 112 the display process terminates at 115.

Thus, processing of the root-node (the node first supplied by the original text search) is interrupted first to process the right-node, and then to process the down-node. Each of those processes may in turn be interrupted to process right-nodes and down-nodes, each of which may in turn be interrupted, etc.

Each time that the processing of a given node terminates (when there is no further right-node and no further down-node to be handled) the program checks at 112 if there are unfinished nodes to process. If such nodes exist, at 112a control is returned to the parent node from which the routine was invoked, and processing picks up where it left off. In the case of the root-node, there is no parent-node, and the process terminates at 115, the whole table of contents having been displayed.

Illustrated in FIG. 9 is an example of such a screen display. The first line is a heading indicating the search request which created this analysis. The remainder of the display represents, by showing the successive criterion keys as headings, the results of the analysis in the form of an organized "table of contents" of the section of the textbase under analysis.

In this "table of contents", lines ending with an arrow, such as line I.B.2, represent the presence of a text which includes only the keywords shown in that line and in the headings above it. In the case of this example, a text has been associated with the keywords "fruit", "oranges" and "jaffa". Analysis right on this text has been completed. If there were more than one text with these keywords, a series of right arrows would be shown on the line, one for each text.

Lines in the table of contents with a number shown in brackets, such as line I.A.1, indicate that there are that number of texts including the keywords shown in that line and in the headings above, as well as other keywords, and those texts are not shown individually in this analysis (i.e., analysis "right" has been terminated at this level).

Line I.C. above shows that there are other categories of texts not included in this table of contents (i.e., analysis "down" has been terminated at this point).

USING THE TABLE OF CONTENTS

The user can either review the texts indicated by the analysis, or ask for a further "expansion" of a group of texts which have not been fully analyzed. The user moves the cursor up and down on the screen to point at the text or group of texts he is interested in; and then presses a key to request that the text be displayed by the word processor or that the group be expanded.

If a text is to be displayed, its number is taken from the non-printing codes embedded in the table of contents. That number corresponds to an entry in the text pointer file 44, where the location of the text itself (within the text file 42) is indicated. The text is read from the text file and passed to the word processor for reading, editing, or printing.

If a group's analysis is to be expanded, the program referes to the non-printing codes embedded in the table of contents to find the location in memory of the list of texts and other information associated with the group. The information is then passed to the analysis and display routines previously described (FIG. 7 and 8). This new analysis is presented in a new screen display, to be used in the same way as the "parent" analysis; the user can continue to "expand" any group until he finds and loads the text he is searching for, or can at any time return to a previous "parent" table of contents to look at a different group of texts.

Further information might be provided to the user by a special header which appears at the top of the screen whenever he stops moving the cursor on the table of contents; this header indicates the list of keywords describing either the text or the group of texts which that line represents. In addition, screen highlighting might be used to indicate that the cursor is pointing at a specific text, or to indicate all lines of the display which are contained in the group referred to by the cursor.

ADDITIONAL FEATURES

FIG. 10 illustrates the basic text analysis procedure of FIG. 7 with additional features being present for enabling the user to modify the basic text analysis.

KEYWORD MANIPULATION DURING ANALYSIS

It is possible to "hide" specified keywords so that they are removed at 88a and do not appear in the analysis at all, to "ignore" keywords at 90a so that they are shown in the results of the analysis but are never used to split the set of texts, or to declare certain keywords as "equal" to each other and substitute therefor at 88b so that they are treated as identical for purposes of the analysis.

Hiding keywords can be useful in cases where some group of keywords, which would otherwise influence the display, are irrelevant for a particular purpose at hand. If the user has asked for words to be "hidden", then at the time that the program obtains the lists of keynumbers associated with each text at 88 by reading them from the text-keyword file 48, the lists are compared to the list of words to be hidden. Keynumbers found on the "hidden" list are simply skipped at 88a, not included in the keyword lists which are subsequently used for the analysis.

Making keywords "equal" to each other is useful in cases where disparate categories are equivalent with respect to a particular task at hand. One frequent case, in particular, is that in which several different keywords have been used (perhaps by different users of a common textbase) to describe what is in fact the same category of information. Words on the "equal" list are arranged in groups of words which will be made "equal" to each other. If the user has asked for words to be made "equal" to each other, then at the time that the program obtains the list of keynumbers at 88 by reading them from the text-keyword file 48, the "equals list" is scanned with each keynumber read from the file. Whenever a match is found, the keynumber which headed the group of equivalent keys on the "equals list" is retained, in place of the number which was actually read from the file at 88b. Thus, the user has effectively changed categories, and potentially combined categories, for the purpose of the current analysis, although the files themselves remain unchanged.

Words which the user has specified are to be "ignored" are included in the lists unchanged, but such a word is never allowed to become a "criterion key". If the user has supplied a list of words to be "ignored", then each time a criterion key is chosen at 90, the chosen keynumber is compared to the list of numbers of keys to be ignored at 90a. If the chosen key is found to be on that list, then it is disallowed as a criterion key at 90b, and the most popular key not on the "ignore" list is chosen as criterion key in its stead. This allows such words to appear on the display without affecting the manner in which sub-groups are defined.

USER SUPPLIED CRITERIA DURING ANALYSIS

If the user is controlling the analysis interactively and indicates at 88c a desire to specify the criterion key directly, a list of all the keywords associated with the texts in the current subgroup (available from the procedure at 90) is placed on the screen. The user enters his choice for the criterion key at 90c, that word's keynumber is found by scanning the keyword file 46 (the key number is the word's position in that file), and that number becomes the criterion key according to which the group of texts is split into "right" and "down" subgroups at 92. This input of a criterion key by the user at 90c then replaces the counting operation at 90 and is used to split the group into two groups at 92.

The user may, in fact, supply at 90c not just one word, but a logical combination of keywords, thus creating a "local" Boolean search request, which is then analyzed just as was the original main search request, as described above and in FIG. 6. The current group of texts is then split into two groups, those satisfying the "local" Boolean search request going to the "right" group, those which do not satisfy it going to the "down" group.

USER SUPPLIED CRITERIA IN OUTLINE FORMAT

It is possible for the user to specify in advance the criterion keys or local search requests which are to be used for some or all iterations of the analysis procedure (i.e., for splitting some or all of the resultant subgroups). The user provides this specification in traditional outline format. The first line of the outline becomes the "current line", and provides the criterion (word or logical combination of words) for the first analysis at 90d, which then proceeds as described in the preceding paragraph at 92. If the line following the current line on the outline is indented further to the right, then it will be used (and become the "current line") when the right-group created by the current analysis, if any, is in turn analyzed. The next line of the outline which has the same level of indentation as the current line, if any, provides the criterion for analysis (and becomes the "current line") when the down-group created by the current analysis, if any, is in turn analyzed. When the right and down groups are in turn analyzed, the lines of the outline which had been respectively selected are then treated as the "current line", and further lines are identified for use in analyzing the resultant new right and down groups. Thus, input of a criterion key from a user-supplied outline at 90d then replaces the counting operation at 90 and is used to split the group into two groups at 92. Any group being analyzed for which no line of the outline has been designated to provide the analysis criterion, is split in either the usual automatic or the usual interactive manner, as described above.

Lines from the outline supplying criteria in the analysis of groups of text at 90d are then reproduced as part of the display lines generated at 102. The result of this procedure is that the user provides an outline of his subject matter, and the system fills that outline with references to whatever texts in his textbase are relevant to each part and sub-part of the outline.

TEXT-SCANNING AS CRITERION DURING ANALYSIS

An additional method of controlling the analysis is to split the group according to the success or failure of a scan for the presence or absence of words (or pairs or groups of words with a specified degree of contiguity) within the texts themselves (rather than checking for words within the keyword list) at 90e. This scanning operation at 90e then replaces the counting operation at 90 and the results are used to split the group into two groups at 92. This provides a facility for the use of what are called "full text searching techniques" (information retrieval techniques not based on designated keywords) in the context of a retrieval system whose major functions are based on the use of keywords. Thus, for example, one could search for a designated pair of words occurring within a same paragraph by scanning for the words within the restricted group of texts which has been isolated at some intermediate stage of the analysis.

MATHEMATICAL CALCULATIONS USED AS CRITERION DURING ANALYSIS

An additional method of controlling the analysis is to split the group of texts into two groups in a manner dependent on the results of a mathematical calculation performed on a number or numbers found either within the text or among the text's keywords at 90f. The numbers to be used are identified by having a particular position on the text's keyword list, or by having a particular position on the text's keyword list, or by having a particular position with respect to some designated word found on the keyword list, or by having a particular positional relationship to some designated word found in the text itself. This numerical calculation at 90f, either on the data found in the keyword list at 88 or on the data found by scanning the text at 90e, then replaces the counting operation at 90 and the results are used to split the group into two groups at 92. As an example, a group of texts might be split into a right-group and a down-group according to their success in fulfilling the criterion "cost is greater than 100", where the number to be inspected is either whatever keyword follows the keyword "cost" on the text's keyword list, or whatever word follows the word "cost" in the text itself.

SIMILARITY SCORING AS CRITERION DURING ANALYSIS

Figure 15:
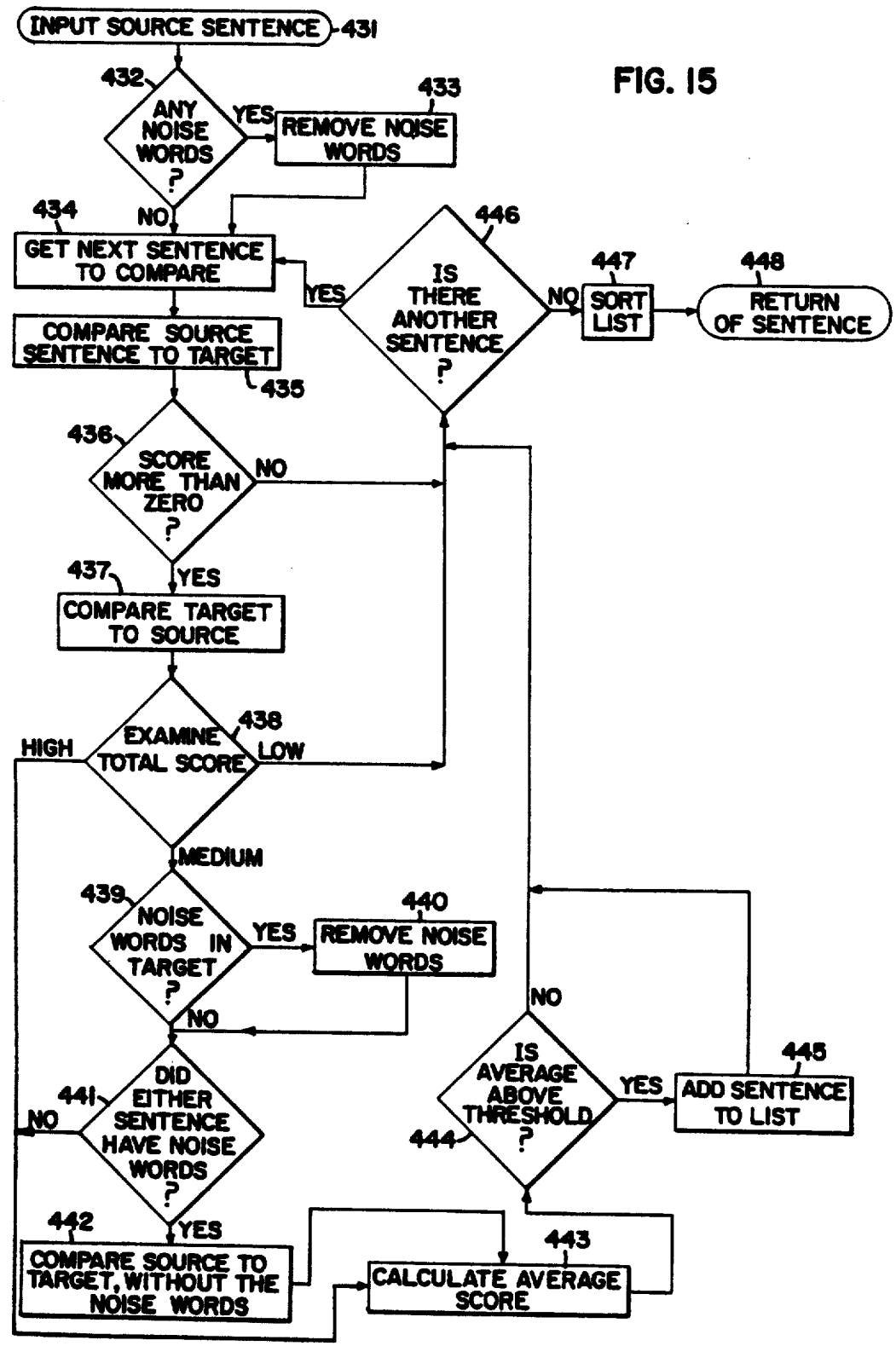
FIG. 15 is a schematic view illustrating the calculation of the similarity between two phrases or sentences or collections of words.

An additional method of controlling the analysis is to inspect the sequence of the keywords for each text (as read in from the text-keyword file 48 at 88) and to split the group of texts into two groups according to criteria dependent on the order of the keywords at 90g. The process by which this prioritization takes place is described below and in FIGS. 15 and 16. This process then replaces the counting operation at 90 and the results are used to split the group into two groups at 92. One use of such an analysis is to provide for prioritization of a group of texts according to the degree of similarity between the set of that text's keywords, treated as a phrase or sentence, and the user's search request, treated as a phrase or sentence, according to the method of measuring similarity described below and in FIGS. 15 and 16. The same method can be implemented in a comparison between the search request and the texts themselves, or portions of the texts, or non-keyword information (e.g., titles, abstracts) associated with the texts.

AUTOMATIC KEYWORDING

One embodiment of the present invention enables users to allocate keywords automatically to texts created by the word processor or texts imported from outside sources.

Figure 11:
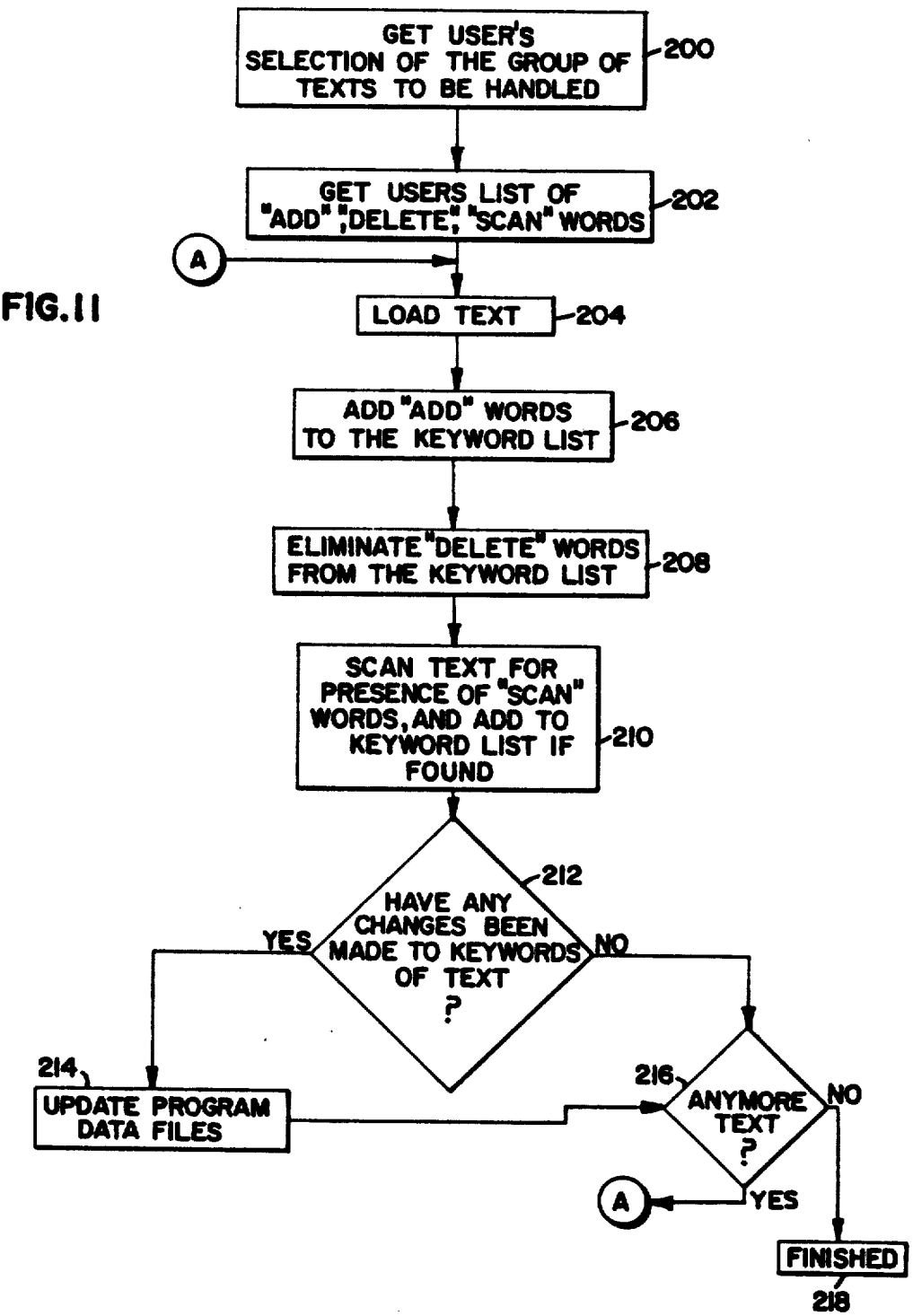
FIG. 11 is a schematic view illustrating automatic keyword modification to groups of text.

The procedure by which keywords are allocated automatically will now be described, referring generally to FIG. 11. The user designates a group of texts by pointing to it on a table of contents at 200, as he would if he were asking to further expand that group. He then presses a key to indicate his desire to alter the keywords of that group (which can, of course, include the entire textbase). He supplies a list of keywords to be added ("add words"), keywords to be eliminated wherever found ("delete words"), and words to become keywords if they are found within the texts themselves ("scan words") at 202. Among the scan words, the symbol "**" is understood to mean that all keywords in the keyword file 46, or all keywords in the keyword file 46 with the exception of a designated list of words, are to be used as scan words.

The implementation then uses the normal text handling routines to load the texts one by one at 204, the keywords list is read, add words are added to it at 206 and delete words are eliminated from it if found at 208. The text is then scanned on a word by word basis, the words of the text being compared to the "scan words" at 210. When a match is found, the scan word is added to the keyword list at 210. By user-selected alternatives, when a match with the scan word is found a) a preliminary check can be made to find whether some designated additional scan word(s) are found within a designated proximity, and only if so is the scan word(s) added to the keyword list, and b) when a match with a scan word is found, some other designated word can be added to the keylist. When the scan is completed, if any changes have been made at 212 in the keylist the files are updated at 214 using normal text-saving procedures. At 216, a check is made if there are any more texts to be handled. If there are no more texts, the routine terminates at 218, otherwise the next text is handled starting at 204.

In the case of automatic keywording of an "imported" file, the implementation reads that file from the disk, creates a new empty keyword list for it, modifies that keyword list as in the above paragraph, and then saves it in the normal fashion.

The result of the "" scan is particularly noteworthy: using it, all texts in the textbase can be keyworded retroactively, so that any mention made (in a text) of a subject which subsequently becomes a "category" (i.e. is keyworded somewhere in the textbase) will subsequently be recognized and found when that subject is searched for. Similarly, the "" scanning of an imported text assures that any subjects mentioned in the imported text which have already been keyworded somewhere within the textbase, will be keyworded in this imported text also.

AUTOMATIC MODIFICATION OF SEARCH REQUEST BY SUBSTITUTION OF "EQUIVALENT" WORDS

Figure 12:
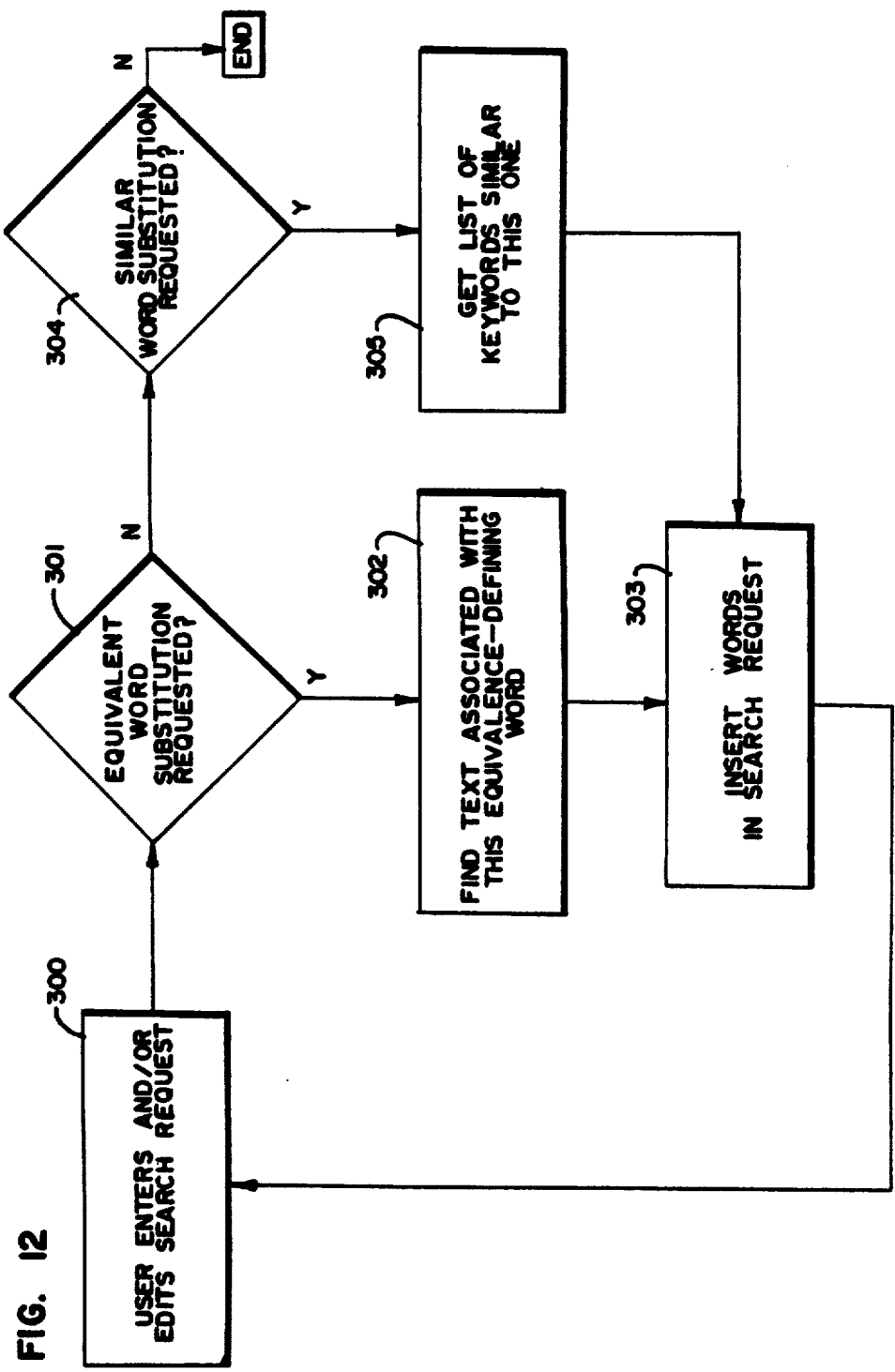
FIG. 12 is a schematic view illustrating the preparation of the search request prior to searching the textbase.

As illustrated in FIG. 12, in the process of the preparation of the search request in FIG. 5, one embodiment of the invention enables the user to cause the search request he enters at 300 to be modified automatically in several ways.

At 301, the program inspects the search request to determine whether the user has indicated (by means of an appropriate symbol) that "equivalent" words or combinations of words may have been previously defined to the system. (This technique is useful both to permit a single word to represent a complex and oft-repeated search request, and to provide the means for providing automatic "equivalence" between the habitual keyword vocabularies of different users of a common textbase system.)

If a word in the search request is proceeded by such a symbol (in this implementation a dollar sign was used), then the word (including the proceeding dollar sign) is searched in the keyword file 46. If found at 302, the text keyword file 48 is scanned to locate the associated text. The text, if one is found, is not displayed through the normal display process, rather the entire text is taken to be a redefinition of the word which had been preceeded by the dollar sign, and is substituted for it in the user's search request at 303. The search request is then again made available to the user for further editing at 300 or for him to repeat his command that the search request be processed.

AUTOMATIC MODIFICATION OF SEARCH REQUEST BY SUBSTITUTION OF SIMILAR WORDS

In similar manner, another symbol, the asterisk, is employed when the user wishes his search request to be expanded to include all the keywords in the system which are similar to words in his search request. At 304 the program inspects the search request to determine whether any of the search words begin or end with an asterisk. If so, the similarity checking routines (described below and in FIGS. 13 and 14) are invoked to find all the keywords in the keyword file 46 which are similar to the given word in the search request. If a list of similar words is found at 305, the words are separated by the word "or", the list is enclosed in parentheses, and the whole is substituted for the original word at 303 in the users search request. Here too, the modified request is again presented to the user for further editing, or for his command to proceed with the processing the request 300.

Once all requested substitutions have taken place, processing proceeds to the locating of texts matching the search request description.

Figure 13B:
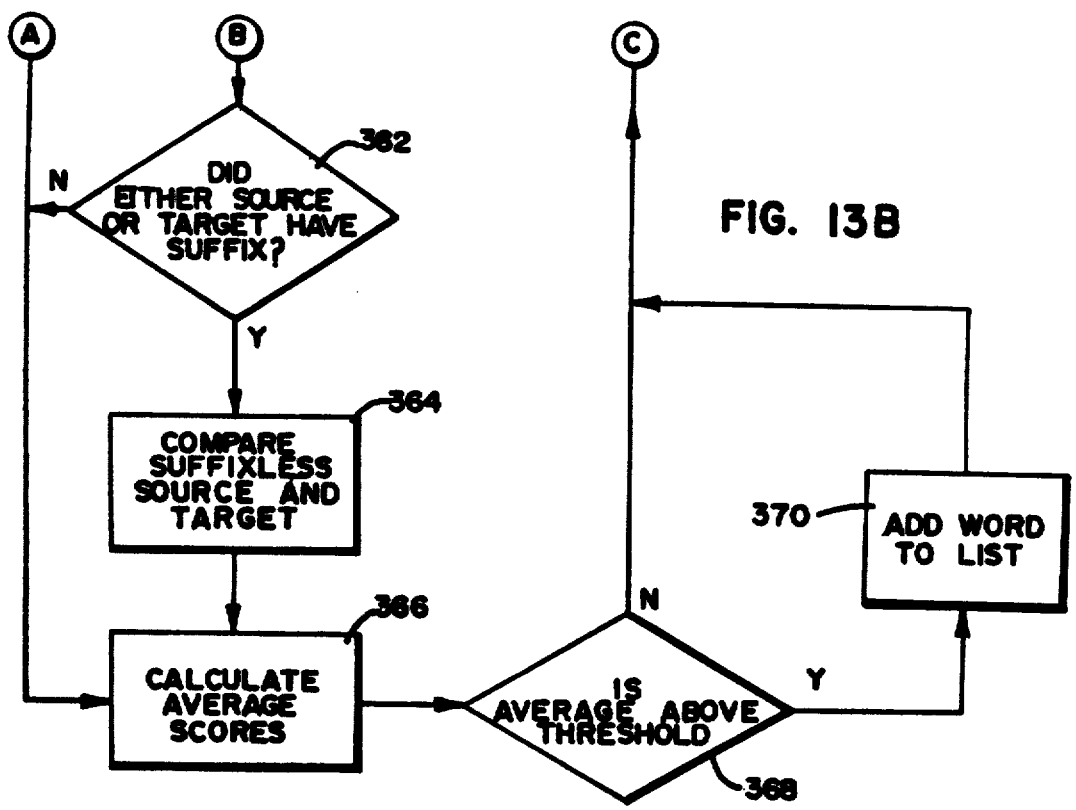

Illustrated in FIGS. 13A-B is a process in accordance with the principles of the present invention, which enable words in a target word list to be identified which are similar to the key words. Indeed, as previously discussed, this aspect of the invention will have application in several other uses, such as spelling checkers and the like. In one implementation, the invention is part of an information retrieval system, where it is used to find key words related to words from a search request provided by the user (whether similar words, or misspellings of the same word).

The source word, i.e., the word to which we intend to find similar words, is input to the process at 342. If it has a suffix, a second copy of the word is made without the suffix 344, 346 and this new version of the word is kept for later use.

The program now fetches a word from the target dictionary at 348, and the original word (including suffix) is compared to the target word at 350 by the process described below and in FIG. 14. If that comparison yields a score of zero or less than zero at 352, the program then checks at 372 if there is another word in the target dictionary to look at, and if there is such a word, fetches it at 348 and continues the comparison process.

If the first comparison results in a score of more than zero, the program now compares the target word with the source word at 354. The comparison is repeated here because the process is essentially asymmetric—the first comparison at 350 checked whether the letter groupings of the source word are to be found in the target word; the second comparison checks whether the letter groupings of the target word are to be found in the source word.

The scores resulting from these two comparisons are now added together and the total score examined. If the total is very low (below 200 out of a possible 2000 at this point), the comparison is abandoned and the program continues to examine the next target word at 348-352. If the total is very high (above 1900 out of 2000), the next stage in the comparison process is bypassed as being unnecessary and the program continues directly to calculating the average score at 366. Alternately, at 358, 360 if the total score falls somewhere between the above cut-off values, the target word is examined to see if it has a suffix; if so, the suffix is removed. If either the source of the target had a suffix, at 362 the suffix-less copy of the source word is now compared with the suffix-less copy of the target word at 364 and the score resulting from this comparison added to the total score. An average is now calculated at 366 for all the comparisons which have been carried out, and if 368 that average score is above a set threshold (400 out of a possible score of 1,000), at 368, 370 the word is added to the list of similar words found.

At 372, the program now checks whether there are any more target words to which the source word should be compared; once the whole target dictionary has been scanned in this way, the list of similar words is sorted into descending numerical order at 374 and the list of words (cut off at some convenient threshold) is returned to the user at 376 for further editing and/or use at 300.

Three comparisons are thus made: the first comparing the source word to the target, then comparing the target to the source, and finally comparing the source to the target where both words have had their suffixes removed. Depending on the scores reached at each stage in the process, further comparisons are halted if a very low score is received, or bypassed in the case of a very high score. (Halting or bypassing comparisons results in very quick processing in the case of clear-cut similarities or differences, and further comparisons are made only if justified by apparent similarities between the words.) The resulting average score is a balanced total of the three different comparisons. The thresholds set at each stage in the analysis are quite arbitrary and may be set to various values depending on the needs of a particular application. Likewise, the different comparisons can be weighted if it is desired to emphasize one comparison over the other, and the words can be examined with prefixes removed as well as, or instead of, removing the suffixes.

Figure 14:
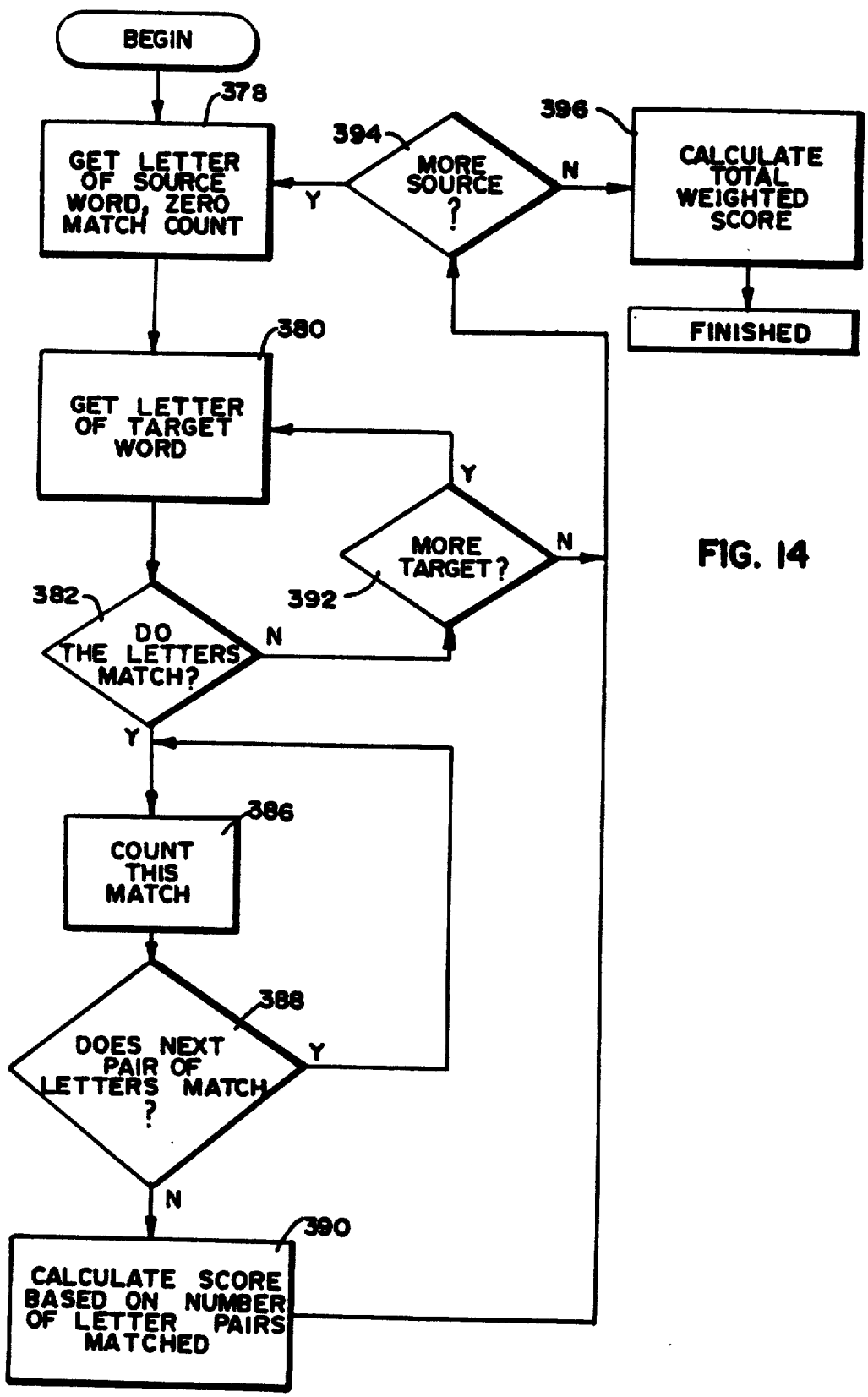
FIG. 14 is a schematic view illustrating an embodiment of the present invention for calculating the degree of similarity between two words.

The comparison routine which carries out the comparisons and allocates the points used in calculating the scores is described in FIG. 14:

The first letter is taken from the source word, and from the target word at 378,380. At 382, these letters are compared to each other. If the letters do not match, then at 392 the program keeps trying to find a match by taking one more letter at a time from the target word until there are not more target letters. The next source letter is then taken, and compared to each target letter in turn, and so on until there are no more source letters to compare.

Once a match is found between the source and target letters, that match is counted at 386, and the following two letters from each word are compared at 388. The process repeats until two letters are found which do not match each other.

The comparison score is then calculated at 390, based on the number of consecutive letters which matched in the two words. This score is obtained from a table which converts the number of matching letters to the appropriate score value. The start of this table is shown below:

| number of matching letters | 1 | 2 | 3 | 4 | 5 | 6 | 7 ... |
|---|---|---|---|---|---|---|---|
| point score | 0 | 1 | 3 | 6 | 10 | 15 | 21 ... |

These values are calculated on the basis of one point for each subgroup (pair, triple, quadruple, etc.) of letters contained in the group of matching letters. A pair contains only one pair, and so is allocated 1 point; a triple contains one triple and two pairs, and so is given 3 points; a quadruple contains three pairs, two triples and one quadruple and so is allocated 6 points. Different weighting systems can easily be implemented depending on the particular needs of a given implementation, to emphasize different sizes of letter groupings.

This process is continued until the entire source word has been scanned at 394. Once the word has been scanned letter by letter in this way, a total weighted score is calculated at 396. This total is obtained by adding together all the subscores generated during the comparison, and dividing them by the total score possible based on the length of the source word. This highest possible total is simply the value found in the scoring table for the length of the source word itself, as this is the value that would have been found by comparing the source word with itself. In this way, the score is adjusted for the length of the word so that the same score will be obtained for words of comparable similarity, no matter their lengths. This final score is multiplied by 1000 in order to convert it to an integer value between 0 and 1000.

The suffixes which this implementation looks for and removes at 346,360 for the final comparison are "ing", "ed", "er", "e", "tion", "al", "s", and "ly".

These suffixes are removed so that grammatically related words (verb forms, adjectives, plurals, etc.) will be found by the program; a different list or a list of prefixes could easily be substituted to suit the needs of a different implementation.

SIMILAR SENTENCES

An identical technique may be used to compare word phrases or sentences rather than individual words. This procedure is detailed in FIG. 15. An input sentence is obtained at 431, and stripped of any words which appear on a list of "noise words" at 432,433. A target sentence is obtained at 434 from a list of sentences describing the texts in the database, and the original source sentence is compared with this target sentence at 435, using the method described below and illustrated in FIG. 16. Depending on the score thus obtained at 436 the program may then continue to compare the target sentence with the source sentence at 437 and depending on the average score so far obtained at 438 will then strip the target sentence of any words appearing on the "noise list" at 439,440. If either source or target sentence had words appearing on this "noise list" at 441, the source sentence is compared a third time to the target sentence, this time where neither sentence includes "noise words" 442. The total scores of all these comparisons is now averaged at 443, and if the average score lies above a predetermined threshold at 444, the target sentence is added to the list of similar sentences found at 445. This procedure is repeated until no more sentences exist in the list of target sentences being examined at 446; at this stage the list of similar sentences found is sorted at 447. At 448, the sorted list is either returned to the user, or is used by the program to control the selection and/or display of texts. In the implementation described above, the list is used at 90g, where a group text is divided into two sub-groups depending on whether each text's comparison score falls above or below a given threshold.

Figure 16:
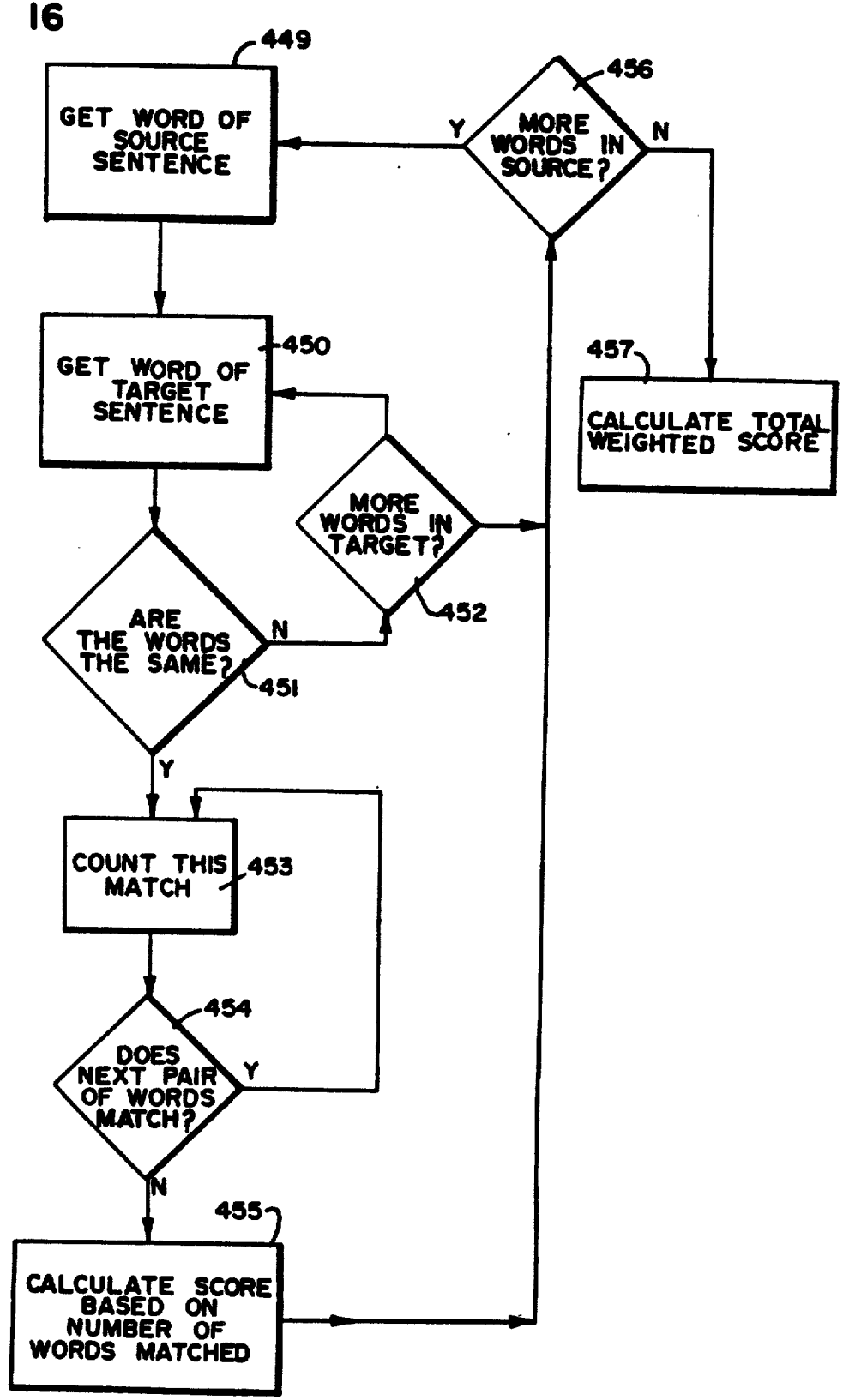
FIG. 16 is a schematic view illustrating the calculation of point scores used in calculating the similarity between two phrases or sentences or collections of words.

The mechanism of the sentence comparisons carried out is detailed in FIG. 16. Here a word of the source sentence at 449 is compared to successive words of the target sentence at 450,452 until matching words are found at 451. Once a matching word is found, the number of successive matching words in the two sentences is counted 453,454 and a score calculated, based on the number of matching words 455, using a table as was described above for the calculation of scores at 390. This process is repeated until all words of the source sentence have been processed 456, at which point a total weighted score is calculated at 457 based on the total score achieved as a proportion of the total possible score for an identical match.

It should be noted that the "sentences" referred to in the paragraphs above may be, but are not necessarily, grammatical natural language sentences. The procedure is also applied to "sentences" which are actually the keyword list provided by the user when he describes the text on saving it in the textbase. Moreover, the request might be a collection of words in a predetermined order having no sentence structure. The program will then search for this collection of words appearing in the specified order within an area of the text. The area of the text might be limited to a predetermined sub-area of the text such as the title, abstract, paragraph, etc. or within a certain number of words. This feature enables the program to distinguish between areas of text having the same words but an entirely different meaning.

It is to be understood that even though the above numerous characteristics and advantages of the invention have been set forth in the foregoing description, together with details of the structure and the function of the invention, the disclosure is illustrative only, and changes may be made in detail, within the principle of the invention, to the full extent indicated by the broad general meaning of the terms in which the appended claims are expressed.

What is claimed is:

1. A method utilizing processor means and associated memory means for making explicit the relationships among texts in a text base stored in the memory means, the relationships being other than those provided by a user, each text in the text base of texts being associated with at least one keyword, the method comprising the steps of:
   (a) the processor means accepting from the user a search request of a search to be performed to locate a first group of the texts;
   (b) the processor means performing the search request described by the user in step (a) among the keywords associated with the texts in the text base to locate the first group of texts having associated keywords matching the search request;
   (c) for each of the keywords associated with at least one of the texts in the first group, the processor means counting the number of texts in the first group associated with each of the keywords;
   (d) the processor means comparing the number of texts associated with each of the keywords to identify the keyword associated with a largest number of texts;
   (e) the processor means defining as a "criterion key" the keyword which is associated with the largest number of texts;
   (f) the processor means separating the first group of texts into first and second sub-groups of texts, the first sub-group of texts including texts having the criterion key as a keyword and the second sub-group of texts including texts not having the criterion key as a keyword;
   (g) repeating steps (c), (d), (e), and (f) at least once using the first sub-group as a group;
   (h) repeating steps (c), (d), (e), and (f) at least once using the second sub-group as a group; and
   (i) displaying the criterion key from steps (e), (g) and (h) on a suitable display medium in a hierarchical manner in which the criterion keys from steps (g) and (h) are displayed in a subsidiary relationship to the criterion key from step (e) so that relationships, based on associations with the criterion key keywords, among the texts in the first group found by the search of step (b) are presented to the user.

2. A method utilizing processor means and associated memory means for making explicit the relationships among texts in a text base stored in the memory means, the relationships being other than those provided by a user, each text in the text base of texts being associated with at least one keyword, the method comprising the steps of:
   (a) the processor means accepting from the user a search request of a search to be performed to locate a first group of the texts;
   (b) the processor means performing the search request described by the user in step (a) among the keywords associated with the texts in the text base to locate the first group of texts having associated keywords matching the search request;

(c) for each of the keywords associated with at least one of the texts in the first group, the processor means counting the number of texts in the first group associated with each of the keywords;

(d) the processor means comparing the number of texts associated with each of the keywords to identify the keyword associated with a largest number of texts;

(e) the processor means defining as a "criterion key" the keyword which is associated with the largest number of texts;

(f) the processor means separating the first group of texts into first and second sub-groups of texts, the first sub-group of texts including texts having the criterion key as a keyword and the second sub-group of texts including texts not having the criterion key as a keyword;

(g) repeating steps (c), (d), (e), and (f) at least once using the first sub-group as a group;

(h) displaying the criterion key from steps (e), and (g) on a suitable display medium in a hierarchical manner in which the criterion key from step (g) is displayed in a subsidiary relationship to the criterion key from step (e) so that relationships, based on associations with the criterion key keywords, among the texts in the first group found by the search of step (b) are presented to the user; and (i) also displaying on the display medium a numerical character in conjunction with the criterion keys of the sub-groups, the numerical character being the number of texts from step (c), at least when the sub-group has more than one text and the sub-group is not separated into further sub-groups on the display medium.

3. A method utilizing processor means and associated memory means for making explicit the relationships among texts in a text base stored in the memory means, the relationships being other than those provided by a user, each text in the text base of texts being associated with at least one keyword, the method comprising the steps of:

(a) the processor means accepting from the user a search request of a search to be performed to locate a first group of the texts;

(b) the processor means performing the search request described by the user in step (a) among the keywords associated with the texts in the text base to locate the first group of texts having associated keywords matching the search request;

(c) for each of the keywords associated with at least one of the texts in the first group, the processor means counting the number of texts in the first group associated with each of the keywords;

(d) the processor means comparing the number of texts associated with each of the keywords to identify the keyword associated with a largest number of texts;

(e) the processor means defining as a "criterion key" the keyword which is associated with the largest number of texts;

(f) the processor means separating the first group of texts into first and second sub-groups of texts, the first sub-group of texts including texts having the criterion key as a keyword and the second sub-group of texts including texts not having the criterion key as a keyword;

(g) repeating steps (c), (d), (e), and (f) at least once using the first sub-group as a group;

(h) displaying the criterion key from steps (e), and (g) on a suitable display medium in a hierarchical manner in which the criterion key from step (g) is displayed in a subsidiary relationship to the criterion key from step (e) so that relationships, based on associations with the criterion key keywords, among the texts in the first group found by the search of step (b) are presented to the user.

4. A method utilizing processor means and associated memory means for making explicit the relationships among texts in a text base stored in the memory means, the relationships being other than those provided by a user, each text in the text base of texts being associated with at least one keyword, the method comprising the steps of:

(a) the processor means accepting from the user a search request of a search to be performed to locate a first group of the texts;

(b) the processor means performing the search request described by the user in step (a) among the keywords associated with the texts in the text base to locate the first group of texts having associated keywords matching the search request;

(c) for each of the keywords associated with at least one of the texts in the first group, the processor means counting the number of texts in the first group associated with each of the keywords;

(d) the processor means comparing the number of texts associated with each of the keywords to identify the keyword associated with a largest number of texts;

(e) the processor means defining as a "criterion key" the keyword which is associated with the largest number of texts;

(f) the processor means separating the first group of texts into first and second sub-groups of texts, the first sub-group of texts including texts having the criterion key as a keyword and the second sub-group of texts including texts not having the criterion key as a keyword;

(g) repeating steps (c), (d), (e), and (f) at least once using the second sub-group as a group;

(h) displaying the criterion key from steps (e), and (g) on a suitable display medium in a hierarchical manner in which the criterion key from step (g) is displayed in a subsidiary relationship to the criterion key from step (e) so that relationships, based on associations with the criterion key keywords, among the texts in the first group found by the search of step (b) are presented to the user; and (i) also displaying on the display medium a numerical character in conjunction with the criterion keys of the sub-groups, the numerical character being the number of texts from step (c), at least when the sub-group has more than one text and the sub-group is not separated into further sub-groups on the display medium.

5. A method utilizing processor means and associated memory means for making explicit the relationships among texts in a text base stored in the memory means, the relationships being other than those provided by a user, each text in the text base of texts being associated with at least one keyword, the method comprising the steps of:

(a) the processor means accepting from the user a search request of a search to be performed to locate a first group of the texts;

(b) the processor means performing the search request described by the user in step (a) among the keywords associated with the texts in the text base to locate the first group of texts having associated keywords matching the search request;

(c) for each of the keywords associated with at least one of the texts in the first group, the processor means counting the number of texts in the first group associated with each of the keywords;

(d) the processor means comparing the number of texts associated with each of the keywords to identify the keyword associated with a largest number of texts;

(e) the processor means defining as a "criterion key" the keyword which is associated with the largest number of texts;

(f) the processor means separating the first group of texts into first and second sub-groups of texts, the first sub-group of texts including texts having the criterion key as a keyword and the second sub-group of texts including texts not having the criterion key as a keyword;

(g) repeating steps (c), (d), (e), and (f) at least once using the second sub-group as a group; and (h) displaying the criterion key from steps (e) and (g) on a suitable display medium in a hierarchical manner in which the criterion key from step (g) is displayed in a subsidiary relationship to the criterion key from step (e) so that relationships, based on associations with the criterion key keywords, among the texts in the first group found by the search of step (b) are presented to the user.

6. A method utilizing processor means and associated memory means for making explicit the relationships among texts in a text base stored in the memory means, the relationships being other than those provided by a user, each text in the text base of texts being associated with at least one keyword, the method comprising the steps of:

(a) the processor means accepting from the user a search request of a search to be performed to locate a first group of the texts;

(b) the processor means performing the search request described by the user in step (a) among the keywords associated with the texts in the text base to locate the first group of texts having associated keywords matching the search request;

(c) for each of the keywords associated with at least one of the texts in the first group, the processor means counting the number of texts in the first group associated with each of the keywords;

(d) the processor means comparing the number of texts associated with each of the keywords to identify the keyword associated with a largest number of texts;

(e) the processor means defining as a "criterion key" the keyword which is associated with the largest number of texts; and (f) displaying the criterion key from step (e) on a suitable display medium so that a relationship, based on associations with the criterion key keyword, among the texts in the first group found by the search of step (b) are presented to the user.

* * * * *